US012557919B2

(12) United States Patent
Ohno

(10) Patent No.: US 12,557,919 B2
(45) **Date of Patent: *Feb. 24, 2026**

(54) BODY STATE DETERMINATION DEVICE, BODY SUPPORT DEVICE, AND BODY STATE DETERMINATION METHOD

(71) Applicant: PARAMOUNT BED CO., LTD., Tokyo (JP)

(72) Inventor: Kenta Ohno, Tokyo (JP)

(73) Assignee: PARAMOUNT BED CO., LTD., Tokyo (JP)

( * ) Notice: Subject to any disclaimer, the term of this patent is extended or adjusted under 35 U.S.C. 154(b) by 746 days.

This patent is subject to a terminal disclaimer.

(21) Appl. No.: 17/874,652

(22) Filed: Jul. 27, 2022

(65) Prior Publication Data

US 2022/0361686 A1 Nov. 17, 2022

Related U.S. Application Data

(63) Continuation of application No. 16/310,020, filed as application No. PCT/JP2018/003396 on Feb. 1, 2018, now Pat. No. 11,432,661.

(30) Foreign Application Priority Data

Feb. 6, 2017 (JP) ................................ 2017-019715

(51) Int. Cl.
*A47C 31/12* (2006.01)
*A47C 27/08* (2006.01)
(Continued)

(52) U.S. Cl.
CPC .......... *A47C 31/123* (2013.01); *A47C 27/082* (2013.01); *A47C 27/083* (2013.01);
(Continued)

(58) Field of Classification Search
CPC ... A47C 31/123; A47C 27/082; A47C 27/083; A47C 27/10; A47C 31/12; A61G 7/05769; A61G 7/05776; A61G 2203/34
See application file for complete search history.

(56) References Cited

U.S. PATENT DOCUMENTS 6,134,732 A * 10/2000 Chapman ........... A61G 7/05776 5/713
8,136,186 B1 * 3/2012 Leach .................... A47C 7/425 5/652
(Continued)

FOREIGN PATENT DOCUMENTS

CN 101734182 A 6/2010
JP 2007-82861 4/2007
(Continued)

OTHER PUBLICATIONS

International Search Report (English) and Written Opinion dated May 15, 2018, from International Application No. PCT/JP2018/003396, 10 pages.

*Primary Examiner* — Justin C Mikowski
*Assistant Examiner* — Amanda L Bailey
(74) *Attorney, Agent, or Firm* — Meunier Carlin & Curfman LLC

(57) ABSTRACT

A body state determination device includes a detection unit that is configured to detect a plurality of pressure distributions formed by a body weight of a user, and a determination unit that is configured to determine a state of a body of the user by comparing the plurality of pressure distributions detected by the detection unit with each other.

18 Claims, 13 Drawing Sheets

(51) Int. Cl.
*A47C 27/10* (2006.01)
*A61G 7/057* (2006.01)

(52) U.S. Cl.
CPC .............. *A47C 27/10* (2013.01); *A47C 31/12* (2013.01); *A61G 7/05769* (2013.01); *A61G 7/05776* (2013.01); *A61G 2203/34* (2013.01)

(56) References Cited

U.S. PATENT DOCUMENTS

| | | | | |
|---|---|---|---|---|
| 9,814,637 | B2 | 11/2017 | Sazonov | |
| 2010/0117414 | A1 | 5/2010 | Hwang et al. | |
| 2012/0277637 | A1* | 11/2012 | Vahdatpour .......... | A47C 31/123 600/595 |
| 2014/0039351 | A1* | 2/2014 | Mix ....................... | G16H 40/20 600/587 |
| 2014/0130264 | A1* | 5/2014 | Misaki ................... | A47C 27/10 5/652 |
| 2015/0157521 | A1* | 6/2015 | Williams ............. | A61H 23/006 5/81.1 R |
| 2016/0045035 | A1* | 2/2016 | Van Erlach .......... | A61B 5/0036 700/279 |

FOREIGN PATENT DOCUMENTS

| | | | |
|---|---|---|---|
| JP | 2012-29869 | 2/2012 | |
| JP | 2014-83141 | 5/2014 | |
| WO | 00-24353 | 5/2000 | |
| WO | 2012122002 | 9/2012 | |
| WO | WO-2015186182 A1 * | 12/2015 | ............. A61B 5/107 |

* cited by examiner

BODY STATE DETERMINATION DEVICE, BODY SUPPORT DEVICE, AND BODY STATE DETERMINATION METHOD

CROSS REFERENCE TO RELATED APPLICATIONS

This application is a continuation application of U.S. application Ser. No. 16/310,020, filed Dec. 14, 2018, which is a U.S. National Phase Application filed under 35 USC § 371 of PCT Application PCT/JP2018/003396 filed Feb. 1, 2018, which claims priority to Japanese Patent Application No. 2017-019715, filed on Feb. 6, 2017, the contents of each of which are fully incorporated by reference.

TECHNICAL FIELD

The present invention relates to a body state determination device, a body support device, and a body state determination method.

BACKGROUND ART

In the related art, an air mat device (body support device) is known which includes a mat unit having a plurality of air cells (fluid cells). For example, as this type of the air mat device, a device disclosed in Patent Document 1 has been proposed. Air (fluid) is supplied into or discharged from the plurality of air cells, thereby forming an upper surface of the mat unit of the air mat device into a desired shape. In this manner, it is possible to adjust pressure distributions (body pressure) of a force applied to the mat unit by a user who sleeps on the mat unit.

If a maximum value of the pressure distributions is great, a body of the user is intensively pressed at a portion where the maximum value is generated, thereby worsening a blood flow of the user. Therefore, techniques have been examined in order to distribute the body pressure of the user by minimizing the maximum value of the pressure distributions.

According to the air mat device disclosed in Patent Document 2, support cells (air cells) for supporting the user are arranged between the mat unit and a base. The support cells are respectively arranged on a right side and a left side of the air mat device.

CITATION LIST

Patent Literature

[Patent Document 1] Published Japanese Translation No. 2002-528175 of the PCT International Publication

[Patent Document 2] Japanese Unexamined Patent Application, First Publication No. 2014-83141

SUMMARY OF INVENTION

Technical Problem

However, for example, when the support cells are utilized, it is desirable to very accurately determine a state of the body of the user.

The present invention is made in view of this problem, and an object thereof is to provide a body state determination device which can accurately determine a state of a body of a user, a body support device including the body state determination device, and a body state determination method.

Solution to Problem

In order to solve the above-described problem, the present invention proposes the following means.

(1) According to an aspect of the present invention, there is provided a body state determination device including a detection unit that is configured to detect a plurality of pressure distributions formed by a body weight of a user, and a determination unit that is configured to determine a state of a body of the user by comparing the plurality of pressure distributions detected by the detection unit with each other.

(12) According to another aspect of the present invention, there is provided a body state determination method including detecting a plurality of pressure distributions formed by a body weight of a user, and determining a state of a body of the user by comparing the plurality of detected pressure distributions with each other.

According to these aspects, for example, the plurality of pressure distributions are compared with each other. In this manner, compared to a case where the state of the body of the user is determined according to one pressure distribution, the state of the body of the user can be accurately determined.

(2) In the body state determination device according to (1) above, the plurality of pressure distributions may be pressure distributions acquired from mutually different sites of the body of the user at the same time.

In this case, the state of the body of the user at the same time can be accurately determined over a wider range of the body.

(3) In the body state determination device according to (2) above, the detection unit may detect the pressure distribution for each of a plurality of regions along a first direction, while supporting the body weight of the user lying along the first direction.

In this case, the state of the body of the user can be detected for each of the (4) In the body state determination device according to (3) above, the plurality of regions may include at least one of a head region, an upper body region, a buttock region, and a foot region.

In this case, the state of the body of the user can be determined for each head of the user by separately detecting the pressure distributions of the user in the head, an upper body other than the head, a buttock, and a foot of the user.

(5) In the body state determination device according to (4) above, in a case where the pressure distribution of a region which is positioned closer to the buttock region than a central portion of the foot region in the first direction is defined as a first foot pressure distribution, and further in a case where the pressure distribution of a region which is positioned closer to a side opposite to the buttock region than the central portion of the foot region is defined as a second foot pressure distribution, when the detection unit is configured to detect that the first foot pressure distribution is greater than 0 Pa at any position and that the second foot pressure distribution is equal to 0 Pa at any position, the determination unit may determine that the state of the body of the user shows a lower limb contracture.

In this case, according to the range whose pressure is detected by the detection unit in the foot region, it is possible to determine that the state of the body of the user shows the lower limb contracture.

(6) In the body state determination device according to (4) or (5) above, in a case where the pressure distribution of a region which is positioned closer to the head region than a central portion of the upper body region in the first direction is defined as a first upper body pressure distribution, and further in a case where the pressure distribution of a region which is positioned closer to the buttock region than the central portion of the upper body region is defined as a second upper body pressure distribution, when the detection unit is configured to detect that a total load generated by the second upper body pressure distribution is higher than a total load generated by the first upper body pressure distribution, the determination unit may determine that the state of the body of the user shows a kyphosis.

In this case, according to a deviation of the total loads of the respective pressure distributions in the first direction of the upper body region detected by the detection unit, it is possible to determine that the state of the body of the user shows the kyphosis.

(7) In the body state determination device according to any one (4) to (6) above, in a case where a direction extending along the detection unit and perpendicular to the first direction is defined as a second direction, and further in a case where the pressure distributions on respective sides in the second direction with respect to a pressure center position in the region are defined as a first pressure distribution and a second pressure distribution, the determination unit may determine an orientation of the user in the region, according to a total load generated by the first pressure distribution and a total load generated by the second pressure distribution.

In this case, according to a magnitude relationship between the total loads generated by the respective pressure distributions in the second direction of the region detected by the detection unit, it is possible to determine the orientation of the user in the region.

(8) In the body state determination device according to (1) above, the plurality of pressure distributions may be pressure distributions acquired from the same site of the body of the user at mutually different times.

In this case, it is possible to accurately determine a time-dependent state change in a certain site of the body of the user.

(9) In the body state determination device according to (8) above, the determination unit may determine the state of the body of the user, according to a change rate obtained in such a way that a change amount of the plurality of pressure distributions is divided by a time difference.

In this case, according to the change rate, it is possible to determine state changing speed of the body of the user.

(10) According to another aspect of the present invention, there is provided a body support device including the body state determination device according to any one of (1) to (9) above, and a support unit that includes the detection unit.

According to this aspect, the pressure distributions can be detected in a stabilized state.

(11) In the body support device according to (10) above, the support unit is a mat unit that has a plurality of fluid cells capable of accommodating a fluid, and the body support device further includes a supply/discharge unit which is configured to supply the fluid to each of the fluid cells and discharges the fluid from each of the fluid cells, and a fluid adjustment unit which is configured to drive the supply/discharge unit, according to determination of the determination unit.

In this case, according to the determination of the determination unit, the fluid adjustment unit drives the supply/discharge unit, thereby enabling the plurality of fluid cells to have a shape adaptable to the state of the body of the user.

(12) According to another aspect of the present invention, there is provided a body state determination method including detecting a plurality of pressure distributions formed by a body weight of a user, and determining a state of a body of the user by comparing the plurality of detected pressure distributions with each other.

Advantageous Effects of Invention

According to the body state determination device, the body support device, and the body state determination method in the above-described respective aspects of the present invention, it is possible to accurately determine the state of the body of the user.

DESCRIPTION OF EMBODIMENTS

First Embodiment

Hereinafter, referring to FIGS. 1 to 20, a first embodiment of a body support device according to the present invention will be described with an exemplary case where the body support device is an air mat device.

Figure 1:
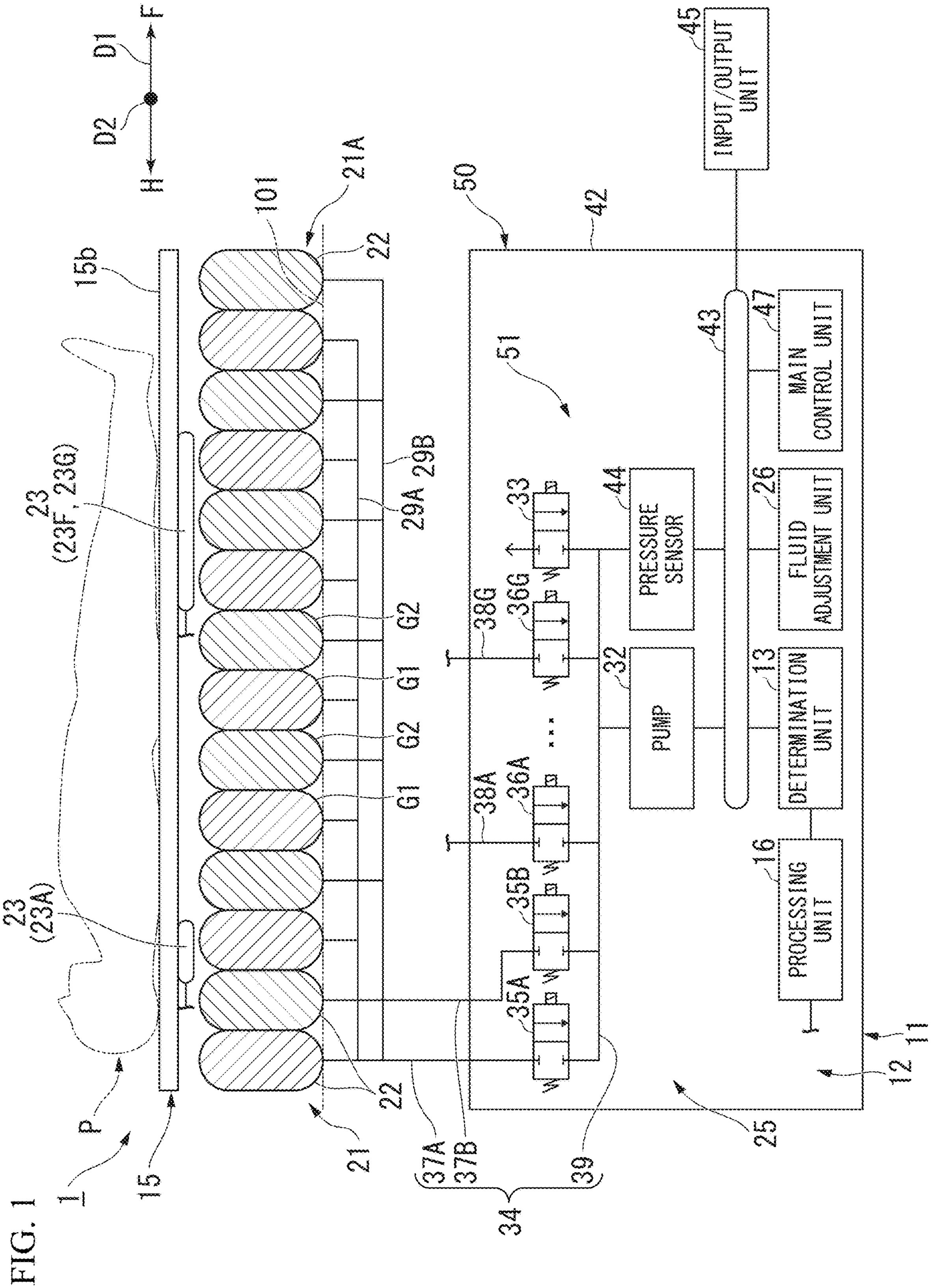
FIG. 1 is a side view showing a schematic configuration of an air mat device according to a first embodiment of the present invention.
Figure 2:
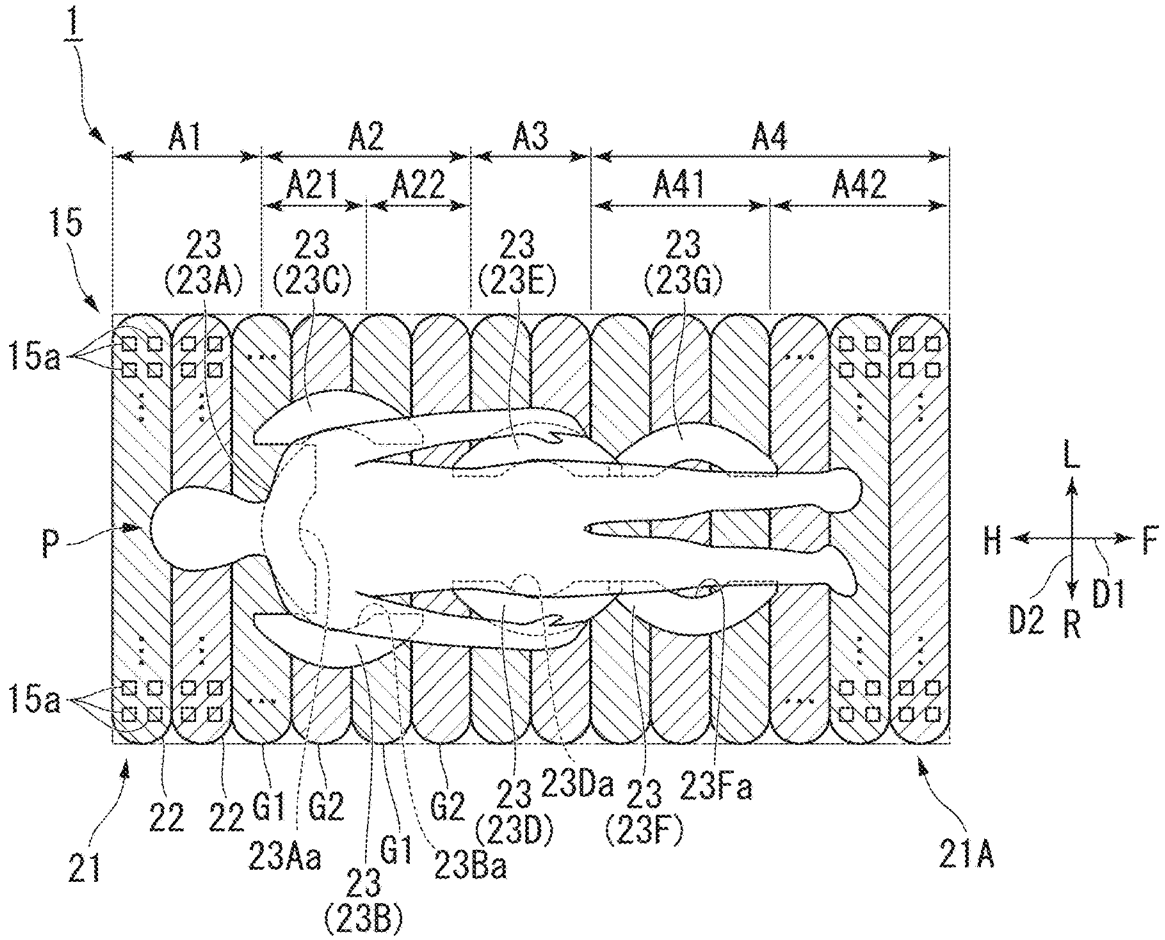
FIG. 2 is a plan view showing a schematic configuration of the air mat device.
Figure 3:
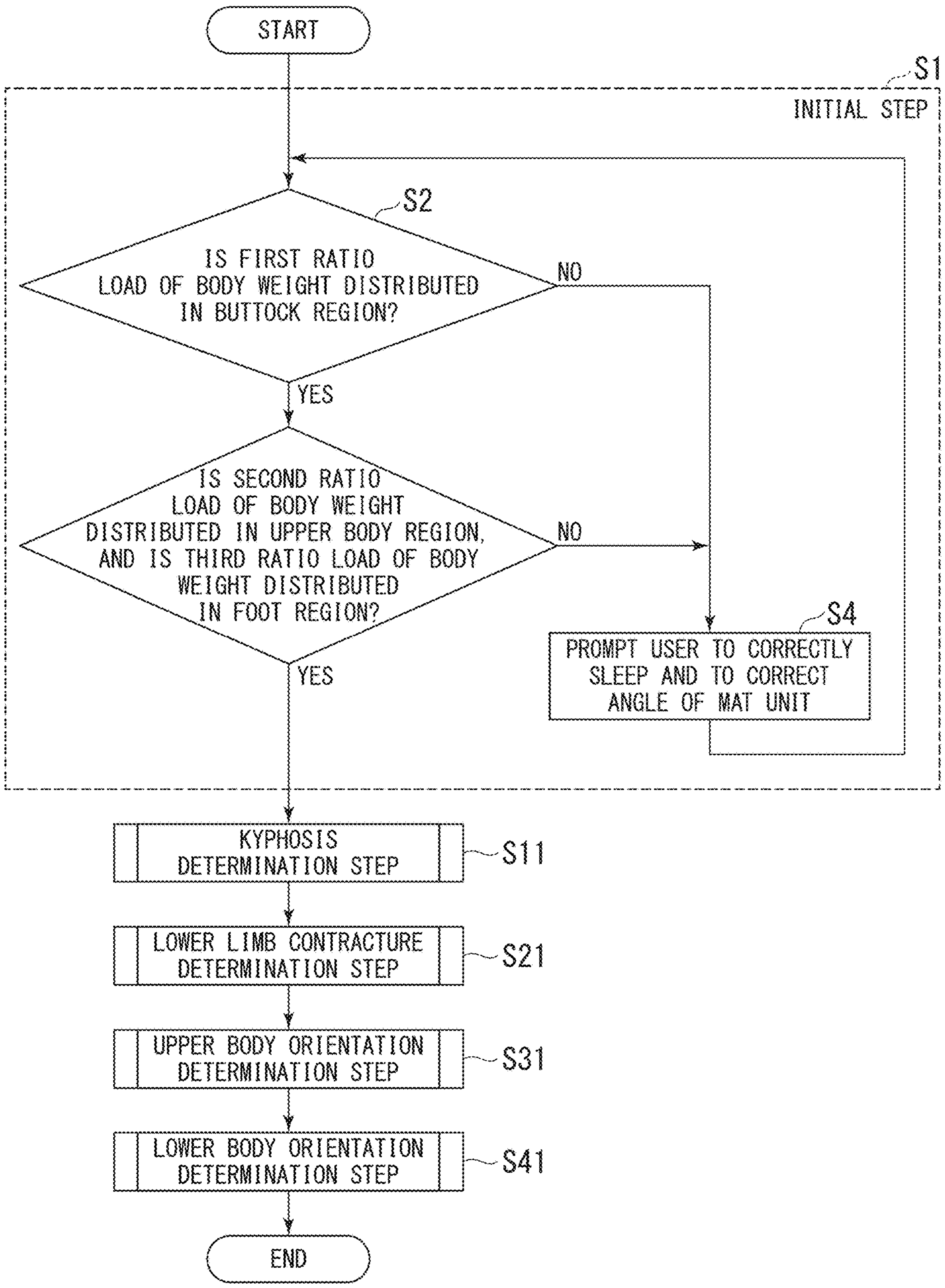
FIG. 3 is a flowchart showing a body state determination method according to the present embodiment.

An air mat device 1 according to the present embodiment shown in FIGS. 1 and 2 can be utilized in a medical environment (including a nursing care environment). In FIG. 1 and the subsequent drawings, an arrow H indicates an orientation to a head side of a user P who sleeps while lying at the supine position in the air mat device 1. In addition, an arrow F indicates an orientation to a leg side of the user P who sleeps while lying at the supine position, an arrow R indicates an orientation to a right side (one side), and an arrow L indicates an orientation to a left side (the other side). Each air cell 22 (to be described later) is shown with hatching for each group.

In the following description, a direction including a head side H and a leg side F will be referred to as a head-foot direction (first direction) D1, and a direction including a right side R and a left side L will be referred to as a rightward-leftward direction (second direction) D2. The rightward-leftward direction D2 is a direction perpendicular to (intersecting) the head-foot direction D1.

The air mat device 1 includes a mat unit (support unit) 21 having a plurality of main air cells (fluid cells) 22, a plurality of auxiliary air cells (fluid cells) 23, and a pressure distribution detection unit (detection unit) 12, a supply/discharge unit 25 for supplying air (fluid) to the air cells 22 and 23 and discharging the air from the air cells 22 and 23, and a fluid adjustment unit 26 for driving the supply/discharge unit 25, according to determination of a determination unit 13 (to be described later) of a body state determination device 11.

The mat unit 21 of the air mat device 1 is supported by a known bed apparatus 101, for example. The bed apparatus 101 may be an apparatus which is divided into a plurality of panel members (not shown) in the head-foot direction D1, and which can perform back-raising and leg-raising (knee-raising) operations by changing an angle of the panel members.

The pressure distribution detection unit 12 detects a plurality of pressure distributions formed by a body weight of the user P. The body state determination device 11 according to the present embodiment is configured to have the pressure distribution detection unit 12 and the determination unit 13 (to be described later).

For example, the pressure distribution detection unit 12 has a sensor unit 15 having a plurality of known pressure sensors 15*a* arranged therein, and a processing unit 16 for processing a detection result of the sensor unit 15. A method of the pressure sensor 15*a* to detect pressure is not particularly limited, and may adopt a capacitance type, a piezoresistance type (pressure sensitive type), or a pneumatic sensor type using a bag-shaped film.

As shown in FIG. 2, the plurality of pressure sensors 15*a* are arranged in a grid pattern along the head-foot direction D1 and the rightward-leftward direction D2, for example. The plurality of pressure sensors 15*a* may not be arranged in a specific portion. Alternatively, one or the plurality of pressure sensors 15*a* may be arranged in a pinpoint manner (locally) in a portion corresponding to an upper body region A2, a buttock region A3 (to be described later), or a waist and a heel of the user P.

The pressure (detection result) detected by the respective pressure sensors 15*a* is transmitted to the processing unit 16. A relative position between the plurality of pressure sensors 15*a* is held by a holding member (not shown). The sensor unit 15 is formed in a sheet shape as a whole. The head-foot direction D1 and the rightward-leftward direction D2 are directions extending along the sensor unit 15 (main surface 15*b* of the sensor unit 15). The user P lies on the sensor unit 15 along the head-foot direction D1. The sensor unit 15 is arranged so as to extend along a horizontal plane.

The pressure (pressure value) is detected by the respective pressure sensors 15*a*. The detected pressure is arranged at positions of the pressure sensors 15*a* in a grid pattern, thereby enabling pressure distributions to be detected.

The mat unit 21 supports the body weight of the user P. The mat unit 21 is divided into four regions along the head-foot direction D1. As shown in FIG. 2, the processing unit 16 detects the pressure distribution for each of four regions A1, A2, A3, and A4. The region A1 is a head region, the region A2 is an upper body region, the region A3 is a buttock region, and the region A4 is a foot region. The head region A1, the upper body region A2, the buttock region A3, and the foot region A4 are located in this order from the head side H toward the leg side F.

The plurality of regions A1, A2, A3, and A4 may be configured to include at least one of the head region A1, the upper body region A2, the buttock region A3, and the foot region A4. The number of the divided pressure distributions detectable by the processing unit 16 is not limited to four, and may be two, three, five, or more.

The head region A1 is a region where the pressure distribution formed by the head of the body of the user P is detected. Similarly, the upper body region A2 is a region where the pressure distribution formed by the upper body other than the head of the body of the user P is detected. The buttock region A3 is a region where the pressure distribution formed by the buttock of the body of the user P is detected. The foot region A4 is a region the pressure distribution formed by the foot of the body of the user P is detected.

The pressure distributions in the regions A1, A2, A3, and A4 show the pressure distributions acquired from mutually different sites such as the head and the upper body other than the head in the body of the user P.

Furthermore, the upper body region A2 has a first upper body region A21 and a second upper body region A22 from the head side H toward the leg side F. The first upper body region A21 is a region close to the head region A1 (region adjacent to the head region A1) from a central portion of the upper body region A2 in the head-foot direction D1. The second upper body region A22 is a region close to the buttock region A3 (region adjacent to the buttock region A3) from the central portion of the upper body region A2 in the head-foot direction D1.

The foot region A4 has a first foot region A41 and a second foot region A42 from the head side H toward the leg side F. The first foot region A41 is a region close to the buttock region A3 (region adjacent to the buttock region A3) from the central portion of the foot region A4 in the head-foot direction D1. The second foot region A42 is a region close to a side opposite to the buttock region A3 from the central portion of the foot region A4 in the head-foot direction D1.

The length in the head-foot direction D1 of the respective regions A1, A2, A3, A4, A21, A22, A41, and A42 is set to have a proper value in accordance with a body type of a plurality of users who use the air mat device 1.

The processing unit 16 has a calculation circuit and a memory (not shown). The memory stores a control program for controlling the calculation circuit. The determination unit 13, the fluid adjustment unit 26, and the main control unit 47 (to be described later) can also be configured in the same way as the processing unit 16.

The memory inside the processing unit 16 stores an area occupied by the respective pressure sensors 15*a*, and a type of the head region A1 to which the respective pressure sensors 15*a* belong. Furthermore, the memory stores a detection result of the pressure which is transmitted from the respective pressure sensors 15*a*. That the memory stores the pressure distributions of the head region A1.

The calculation circuit can calculate a total load acting on the head region A1 from a plurality of pressures stored in the memory.

The processing unit 16 may be attached to the sensor unit 15.

The configuration of the respective main air cells 22 is not particularly limited. According to the present embodiment, as shown in FIGS. 1 and 2, the respective main air cells 22 are rod-shaped cells extending over the entire length of the mat unit 21 in the rightward-leftward direction D2. The plurality of main air cells 22 are arrayed parallel to each other in the head-foot direction D1, thereby configuring a main mat unit 21A which forms an outer shape of the mat unit 21. The main mat unit 21A is configured to include 20 to 30 main air cells 22, for example.

For example, the respective main air cells 22 can be manufactured by welding a vinyl chloride or urethane film into a bag shape. The main air cells 22 arranged adjacent to each other in the head-foot direction D1 may be fixed to each other, or may not be fixed to each other. The respective main air cells 22 can be fixed to a cover (not shown) for integrally covering the plurality of main air cell 22 via a button or a string.

The main mat unit 21A is arranged below the sensor unit 15. The main mat unit 21A may be arranged above the sensor unit 15.

The plurality of main air cells 22 are divided into a plurality of groups G1 and G2. That is, the plurality of main air cells 22 are divided into two groups such as a first group G1 and a second group G2. The number of groups into which the plurality of main air cells 22 are divided is not particularly limited. The plurality of main air cells 22 may be divided into three or more groups. Alternatively, the plurality of main air cells 22 may belong to one group without being divided into the plurality of groups.

In this example, the main air cells 22 belonging to the same group are arranged at every other location along the head-foot direction D1 in the main mat unit 21A. That is, the main air cell 22 belonging to the first group G1 and the main air cell 22 belonging to the second group G2 are alternately arranged along the head-foot direction D1 in the main mat unit 21A. Interiors of the main air cells 22 belonging to the first group G1 communicate with each other through a communication path 29A. Therefore, in the main air cells 22 belonging to the first group G1, internal pressures fluctuate in synchronization with each other. An air tube made of a vinyl chloride resin can be suitably used for the communication path 29A.

The main air cells 22 belonging to the second group G2 are configured in the same way. Interiors of the main air cells 22 belonging to the second group G2 communicate with each other through a communication path 29B.

In the present embodiment, seven auxiliary air cells 23A to 23G are used as the auxiliary air cells 23. When the auxiliary air cells 23A to 23G are referred without any distinction, all of these will be collectively referred to as the auxiliary air cells 23. The respective auxiliary air cells 23 are formed in the same shape, for example, in a crescent shape. The respective auxiliary air cells 23 can be manufactured in the same manner as the main air cells 22. The number of the auxiliary air cells 23 belonging to the mat unit 21 is not particularly limited as long as the number of the auxiliary air cells 23 is one or more. The shape of the auxiliary air cells 23 is not limited to the crescent shape, and the shapes of the respective auxiliary air cells 23 may be different from each other.

As shown in FIG. 2, for example, the auxiliary air cell 23A extends in the rightward-leftward direction D2, and is arranged so that a recess 23Aa faces the leg side F. The auxiliary air cell 23A is arranged in an upper portion of the central portion in the rightward-leftward direction D2 in the upper body region A2 of the sensor unit 15 so as to come into contact with a neck of the user P, for example.

The auxiliary air cell 23B extends in the head-foot direction D1, and is arranged so that a recess 23Ba faces the left side L. The auxiliary air cell 23B is arranged in a portion on the right side R in the upper body region A2 of the sensor unit 15 so as to come into contact with a right shoulder of the user P, for example.

The auxiliary air cell 23C is arranged so as to face the auxiliary air cell 23B in the rightward-leftward direction D2.

The auxiliary air cell 23D extends in the head-foot direction D1, and is arranged so that a recess 23Da faces the left side L. The auxiliary air cell 23D is arranged in a portion on the right side R in the buttock region A3 of the sensor unit 15 so as to come into contact with a right buttock of the user P, for example.

The auxiliary air cell 23E is arranged so as to face the auxiliary air cell 23D in the rightward-leftward direction D2.

The auxiliary air cell 23F extends in the head-foot direction D1, and is arranged so that a recess 23Fa faces the left side L. The auxiliary air cell 23F is arranged in a portion on the right side R in the first foot region A41 of the sensor unit 15 so as to come into contact with a right knee of the user P, for example.

The auxiliary air cell 23G is arranged so as to face the auxiliary air cell 23F in the rightward-leftward direction D2.

For example, the auxiliary air cells 23A to 23G are arranged between the main mat unit 21A and the sensor unit 15.

The determination unit 13 determines the state of the body of the user P by comparing the plurality of pressure distributions in the head region A1 detected by the pressure distribution detection unit 12. The determination unit 13 determines the state of the body of the user P, specifically, at least one of the kyphosis of the body of the user P, the lower limb contracture, and a bent state and a twisted state from a horizontal position which show orientations of the upper body and the lower body. Furthermore, the determination unit 13 determines a difference between a supine position and a lateral position, an open/closed state of the foot or arm at the supine position, the orientation of the body when the back is raised, or an unbalanced posture.

The memory inside the determination unit 13 preliminarily stores a fourth ratio indicating a ratio with respect to the body weight of the user P, a fifth ratio indicating a ratio of the total load acting on the upper body region A2 and the right and left buttock regions A3, and a sixth ratio. As will be described later, first to third ratios are stored in the main control unit 47.

For example, the fourth to sixth ratios can be set to a value of "10%" or a range of "20% to 30%%".

The control flow of the determination unit 13 will be described later.

A configuration of the supply/discharge unit 25 is not particularly limited. As shown in FIG. 1, for example, the supply/discharge unit 25 includes a pump 32 that is configured to supply air to the air cells 22 and 23, an air discharge valve 33 that is configured to discharge the air from the air cells 22 and 23, a connecting path 34, and a plurality of on-off valves 35A, 35B, and 36A to 36G that is configured to open and close the connecting path 34. The air cells 22 and 23 is connected to the pump 32 via a connecting path 34, and the air cells 22 and 23 is connected to the air discharge valve 33 via a connecting path 34.

The connecting path 34 has a diverging path 37A arranged corresponding to the groups G1 of the main air cell 22 and a diverging path 37B arranged corresponding to the groups G2 of the main air cell 22, seven diverging paths 38A to 38G respectively arranged corresponding to the auxiliary air cells 23A to 23G, and a common path 39 to which the diverging paths 37A, 37B and 38A to 38G are connected in common. The diverging path 37A is connected to the communication path 29A, and the diverging path 37B is connected to the communication path 29B. The diverging path 37A may be directly connected to the main air cell 22 of the first group G1. Similarly, the diverging path 37B may be directly connected to the main air cell 22 of the second group G2.

The diverging path 38A is connected to the auxiliary air cell 23A. Similarly, the diverging paths 38B to 38G are respectively connected to the auxiliary air cells 23B to 23G.

The common path 39 connects each of the diverging paths 37A, 37B, and 38A to 38G to the pump 32 and the air discharge valve 33.

The on-off valve 35A switches between an open state and a closed state. In the open state, the diverging path 37A communicates with the pump 32 and the air discharge valve 33. In the closed state, the communication therebetween is released. The on-off valves 35B and 36A to 36G also perform the same switching operation between the diverging paths 37B and 38A to 38G, and the pump 32 and the air discharge valve 33.

The supply/discharge unit 25 configured in this way is operated as follows.

That is, for example, in a case where the air is supplied to (air supply) to the respective main air cells 22 of the first group G1, the on-off valve 35A is brought into an open state, and the on-off valves 35B, 36A to 36G, and the air discharge valve 33 are brought into in a closed state. The pump 32 is driven, thereby supplying the air into the respective main air cells 22 of the first group G1 through the common path 39, the diverging path 37A and the communication path 29A. The supplied air is accommodated inside the respective main air cells 22.

On the other hand, in a case where the air is discharged from the respective main air cells 22 of the first group G1, the on-off valve 35A is brought into an open state, and the on-off valves 35B and 36A to 36G are brought into a closed state. The air discharge valve 33 is brought into an open state. In this manner, the air inside the respective main air cells 22 of the first group G1 is discharged outward from the air discharge valve 33 through the communication path 29A, the diverging path 37A, and the common path 39.

In the respective main air cells 22 and the respective auxiliary air cells 23 of the second group G2, the air can be similarly supplied and discharged.

The above-described on-off valves 35A, 35B, 36A to 36G, the pump 32, the air discharge valve 33, and the common path 39 are accommodated in a casing 42. The pressure sensor 44, the fluid adjustment unit 26, and the main control unit 47 which are connected to a bus 43 serving as a transmission path are accommodated in the casing 42. The on-off valve 35A accommodated inside the casing 42 configures a control unit 50. An input/output unit 45 is arranged outside the casing 42, and is connected to the bus 43.

The above-described determination unit 13, the pump 32, the air discharge valve 33, and the on-off valves 35A, 35B, and 36A to 36G are connected to the bus 43.

The pressure sensor 44 has a known configuration, and is connected to the above-described common path 39. The pressure sensor 44, the connecting path 34, the on-off valves 35A, 35B, and 36A to 36G configure an internal pressure detection unit 51.

That is, according to the present embodiment, there is provided the pressure sensor 44 common to the respective main air cells 22 and the auxiliary air cells 23. The internal pressure detection unit 51 detects the pressure inside the main air cells 22 of the group G1 and G2 and inside the respective auxiliary air cells 23 through the connecting path 34.

For example, in a case where the internal pressure detection unit 51 detects the pressure inside the respective main air cells 22 of the first group G1, the on-off valve 35A is brought into an open state, and the on-off valves 35B and 36A to 36G are brought into a closed state so as to detect the pressure inside the respective main air cells 22 of the first group G1.

The internal pressure detection units 51 may be respectively arranged corresponding to the main air cell 22 of each group G1 and the respective auxiliary air cells 23.

Although not shown, the input/output unit 45 has an input device such as a keyboard and an output device such as a liquid crystal monitor. An instruction input through the input device by a caregiver such as a medical worker is transmitted via the bus 43 to the fluid adjustment unit 26 and the main control unit 47. The output device displays results determined by the determination unit 13.

The fluid adjustment unit 26 drives the pump 32 of the supply/discharge unit 25, the air discharge valve 33, and the on-off valves 35A, 35B, and 36A to 36G, according to the determination of the state of the body of the user P, which is determined by the determination unit 13.

The main control unit 47 performs overall control for the air mat device 1. The memory inside the main control unit 47 preliminarily stores the first ratio indicating the ratio with respect to the body weight of the user P, the second ratio, and the third ratio. Each ratio can be set in the same manner as the above-described fourth to sixth ratios.

Next, a body state determination method and an operation of the air mat device 1 according to the present embodiment will be described. FIGS. 3 to 7 are flowcharts showing the body state determination method according to the present embodiment.

If a caregiver operates the input device of the input/output unit 45, the air mat device 1 is activated. After the air mat device 1 is activated, in an initial state before the user P rides at the supine position on the sensor unit 15, the fluid adjustment unit 26 is operated as follows. That is, the fluid adjustment unit 26 drives the pump 32, and switches the air discharge valve 33, the on-off valves 35A, 35B, and 36A to 36G so as to bring the respective main air cells 22 and the auxiliary air cells 23A to 23G into an initial state. In the initial state, the air pressure inside the respective main air cells 22 is controlled to maintain relatively high pressure (for example, 4 to 5 kPaG (kilopascal gauge)).

In this manner, for example, even if the user P having a maximum use load of the air mat device 1 rides at the supine position, it is possible to prevent the user P from having a bottom contact feeling.

On the other hand, in the initial state, no air is supplied to the respective auxiliary air cells 23, and the respective auxiliary air cells 23 are in a flat state.

For example, if the user P lies at the supine position along the head-foot direction D1 on the sensor unit 15, the sensor unit 15 detects the pressure distributions formed by the body weight of the user P. The detection results of the respective pressure sensors 15*a* of the sensor unit 15 are transmitted to the processing unit 16. The transmitted pressure distributions are stored in the memory of the processing unit 16 for each of the respective regions A1, A3, A21, A22, A41, and A42. The pressure distributions of the respective regions A1, A3, A21, A22, A41, and A42 are pressure distributions acquired from mutually different sites at the same time.

For example, the calculation circuit of the processing unit 16 calculates a total load generated (acting) by the pressure distributions in the head region A1 by adding values obtained by multiplying the pressure detected by the respective pressure sensors 15*a* belonging to the head region A1 by an area occupied by the pressure sensor 15*a*. Similarly, the calculation circuit of the processing unit 16 calculates the total load generated by the pressure distributions of the respective regions A21, A22, A3, A41, and A42. The total load generated by the pressure distribution in the upper body region A2 is calculated by adding the total load generated by the pressure distribution in the second upper body region A22 to the total load generated by the pressure distribution in the first upper body region A21. Similarly, the total load generated by the pressure distribution in the foot region A4 is calculated by adding the total load generated by the pressure distribution in the second foot region A42 to the total load generated by the pressure distribution in the first foot region A41.

The body weight of the user P is calculated by summing the total loads generated by the pressure distributions of the respective regions A1, A2, A3, and A4.

Figure 11:
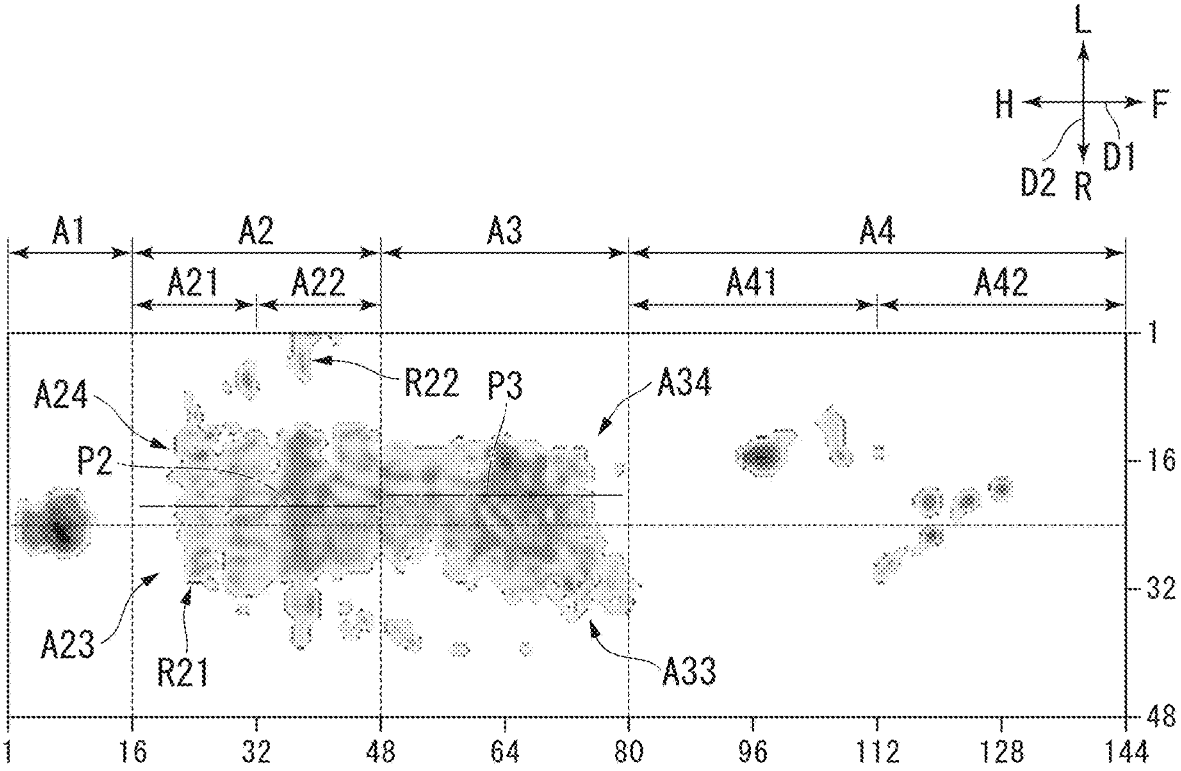
FIG. 11 is a view showing a pressure distribution detected by a pressure distribution detection unit.

As shown in FIG. 11, the calculation circuit calculates a pressure center position P2 of the pressure distribution in the upper body region A2. For example, the pressure center position P2 is a center line with respect to the width in the rightward-leftward direction D2 of a range in which the pressure is distributed.

In this case, the pressure distribution in the upper body region A2 may be divided into a main region R21 which is a region where the pressure is continuously distributed over the widest range inside the upper body region A2 and a separate region R22 which is a region where the pressure is distributed separate from the main region R21. Then, the pressure center position may be used as the center of gravity of the position of the pressure sensor 15*a* which detects the pressure in the main region R21 of the upper body region A2.

Similarly, the calculation circuit calculates a pressure center position P3 of the pressure distribution in the buttock region A3.

The calculation circuit calculates each of the total load generated by the pressure distribution in an upper body right side region A23 on the right side R with respect to the pressure center position P2 in the upper body region A2 and the total load generated by the pressure distribution in an upper body left side region A24 on the left side L with respect to the pressure center position P2 in the upper body region A2.

The calculation circuit calculates each of the total load generated by the pressure distribution in a buttock right side region A33 on the right side R with respect to the pressure center position P3 in the buttock region A3 and the total load generated by the pressure distribution in a buttock left side region A34 on the left side L with respect to the pressure center position P3 in the upper body region A2.

The total load generated by the pressure distribution for each of the calculated regions A23, A24, A33, and A34 is stored in the memory of the processing unit 16.

The processing unit 16 transmits the calculated load acting on the respective regions and the calculated body weight of the user P to the main control unit 47 and the determination unit 13. Each of load and the body weight is stored in the memory of the main control unit 47 and the determination unit 13.

As described above, the calculation serving as a basic operation for determining the state of the body of the user P is completed.

Next, before the state of the body is determined, an initial step (Step S1 in FIG. 3) of adjusting an initial position of the user P is performed.

In Step S2 in the initial step S1 described below, the step is performed since it is considered that the position in the head-foot direction D1 where the user P sleeps with respect to the sensor unit 15 is uniquely defined around the buttock of the user P. In addition, in Step S3 in the initial step S1, the step is performed so that the user P correctly sleeps on the sensor unit 15.

In the initial step S1, the main control unit 47 determines whether or not a first ratio load of the body weight of the user P is distributed in (acts on) the buttock region A3, according to the transmitted load acting on the buttock region A3 and the body weight of the user P (Step S2). A fact that the first ratio load of the body weight of the user P is distributed in the buttock region A3 means that the user P sleeps in a state where the buttock is correctly placed on the buttock region A3 and the body weight of the user P is concentrated on the buttock region A3 to some extent.

When it is determined as YES in Step S2, the process proceeds to Step S3. On the other hand, if it is determined as NO in Step S2, the process proceeds to Step S4.

Step S3, the main control unit 47 determines whether or not a second ratio load of the body weight of the user P is distributed in the upper body region A2 and a third ratio load of the body weight of the user P is distributed in the foot region A4. A fact that the second ratio load of the body weight of the user P is distributed in the upper body region A2 means that the user P sleeps in a state where the upper body other than the head is correctly placed on the upper body region A2. A fact that the third ratio load of the body weight of the user P is distributed in the foot region A4 means that the user P sleeps in a state where the foot is correctly placed on the foot region A4.

When it determined as YES in Step S3, the initial step S1 is completed, and the process proceeds to Step S11. On the other hand, when it is determined as NO in Step S3, the process proceeds to Step S4.

In Step S4, the main control unit 47 causes the output device of the input/output unit 45 to display to prompt the user P to correctly sleep on the sensor unit 15 or to display to prompt the user P to correct an angle of the mat unit 21 by raising the bed apparatus 101. Then, the process proceeds to Step S2. A caregiver operates and raises the bed apparatus 101. In addition, the user P correctly sleeps with assistance of the caregiver, if necessary.

Until it is determined as YES in Step S2 and it is further determined as YES in Step S3, Steps S2, S3, and S4 are repeatedly performed.

Figure 4:
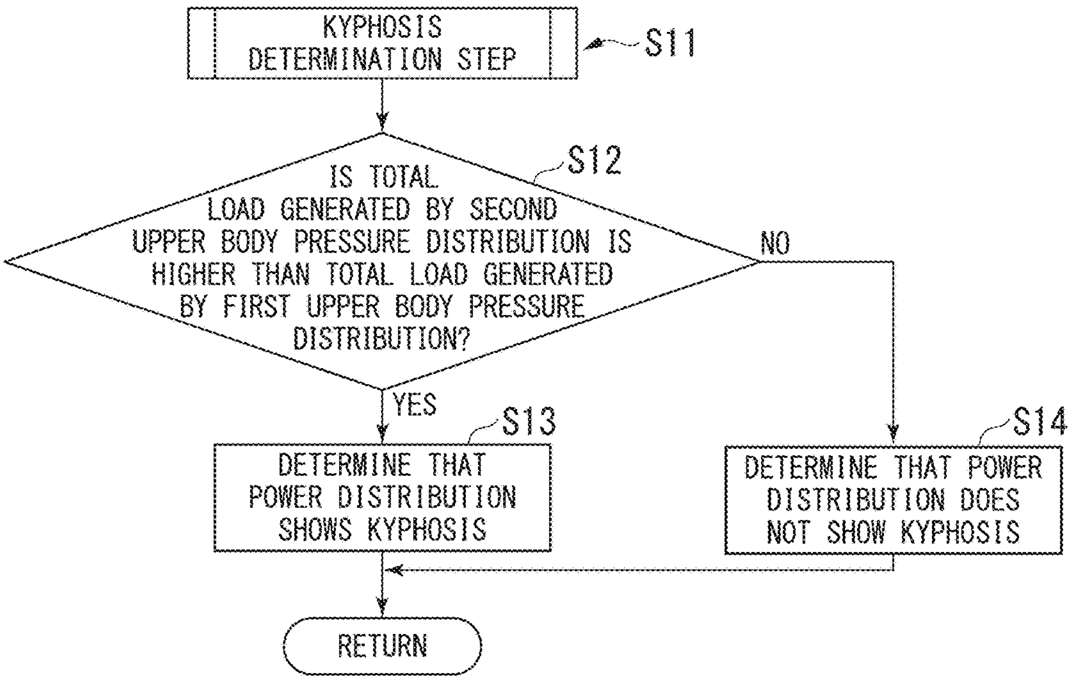
FIG. 4 is a flowchart showing a kyphosis determination step according to the body state determination method.

Step S11, a kyphosis determination step is performed. As shown in FIG. 4, the determination unit 13 first determines whether or not the total load generated by the second upper body pressure distribution which is the pressure distribution in the second upper body region A22 is higher than the total load generated by the first upper body pressure distribution which is the pressure distribution in the first upper body region A21 (Step S12). In other words, the total load generated by the first upper body pressure distribution and the total load generated by the second upper body pressure distribution are compared with each other, thereby determining whether or not the load acting on the upper body region A2 is biased to the buttock region A3 side (leg side F). If the user P suffers the kyphosis, the upper body of the user P is bent to the leg side F. Accordingly, the determination is made in this way.

In Step S12, a deviation of the load acting on the upper body region A2 may be determined by comparing the plurality of pressure distributions such as the first upper body pressure distribution detected by the pressure distribution detection unit 12 with each other.

n it is determined as YES in step S12, the process proceeds to Step S13. On the other hand, when it is determined as NO in Step S12, the process proceeds to Step S14.

In Step S13, the determination unit 13 determines that the body of the user P is bent and the state of the body of the user P shows the kyphosis. Then, Step S11 is all completed, and the process proceeds to Step S21. In Step S14, the determination unit 13 determines that the user P does not suffer the kyphosis.

Then, Step S11 is all completed, and the process proceeds to Step S21.

Figure 5:
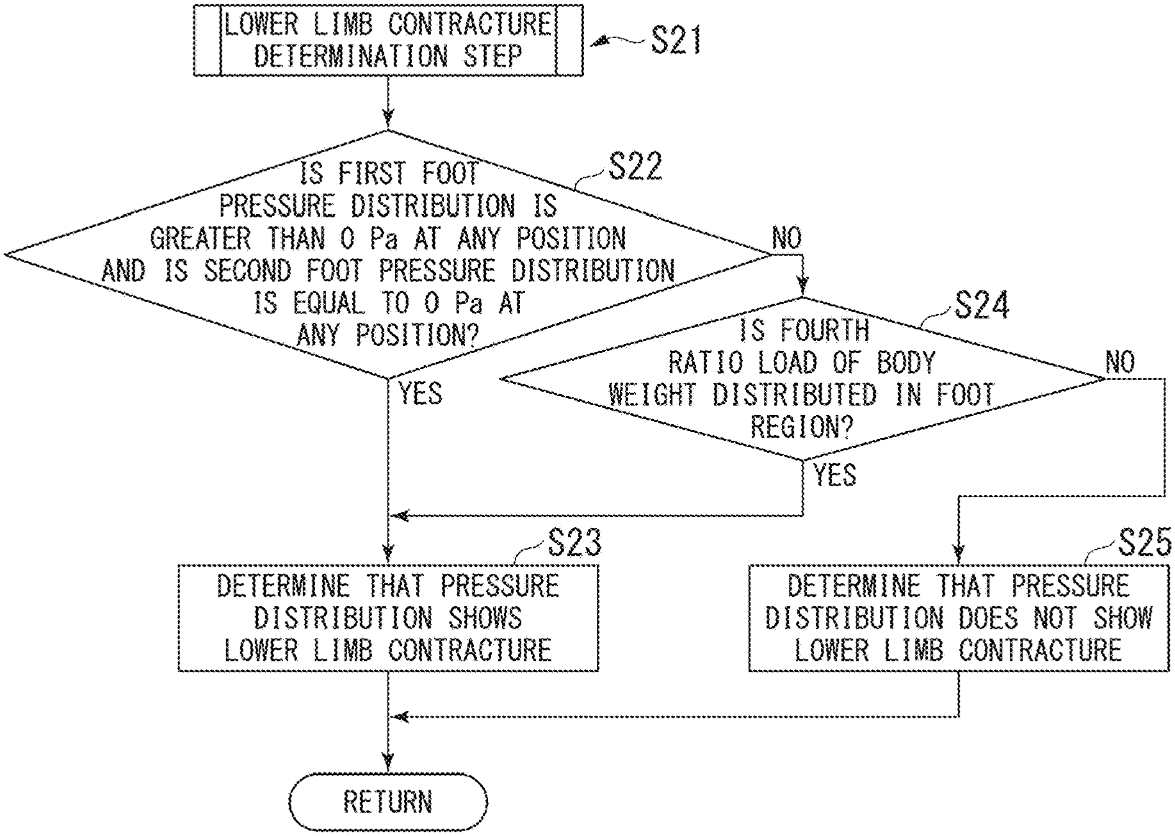
FIG. 5 is a flowchart showing a lower limb contracture determination step according to the body state determination method.

Step S21, a lower limb contracture determination step is performed. As shown in FIG. 5, the determination unit 13 first determines whether or not the first foot pressure distribution which is the pressure distribution in the first foot region A41 is greater than 0 Pa (Pascal) at any position and the second foot pressure distribution which is the pressure distribution in the second foot region A42 is equal to 0 Pa at any position (Step S22). In other words, the first foot pressure distribution and the second foot pressure distribution are compared with reference pressure which is 0 Pa.

The fact that the first foot pressure distribution is greater than 0 Pa at any position means that any one of the plurality of pressure sensors 15*a* corresponding to the first foot region A41 detects the pressure greater than 0 Pa. A fact that the second foot pressure distribution is equal to 0 Pa at any position means that any one of the plurality of pressure sensors 15*a* corresponding to the second foot region A42 detects the pressure of 0 Pa.

If the user P suffers the lower limb contracture, the foot of the user P is less likely to stretch to the leg side F. Accordingly, the determination is made in this way.

When it is determined as YES in Step S22, the process proceeds to Step S23. On the other hand, when it is determined as NO in Step S22, the process proceeds to Step S24.

In Step S23, the determination unit 13 determines that the state of the body of the user P shows the lower limb contracture. Then, Step S21 is all completed, and the process proceeds to Step S31.

In Step S24, the determination unit 13 determines whether or not a fourth ratio load of the body weight of the user P is distributed in the foot region A4. A fact that the fourth ratio load of the body weight of the user P is distributed in the foot region A4 means that although the foot of the user P stretches to the leg side F, the weight of the foot is lighter than the whole weight of the user P. If the user P suffers the lower limb contracture, the weight of the foot is lighter than the whole weight of the user P. Accordingly, the determination is made in this way.

When it is determined as YES in Step S24, the process proceeds to Step S23. On the other hand, when it is determined as NO in Step S24, the process proceeds to Step S25.

In Step S25, the determination unit 13 determines that the user P does not suffer the lower limb contracture. Then, Step S21 is all completed, and the process proceeds to Step S31.

Figure 6:
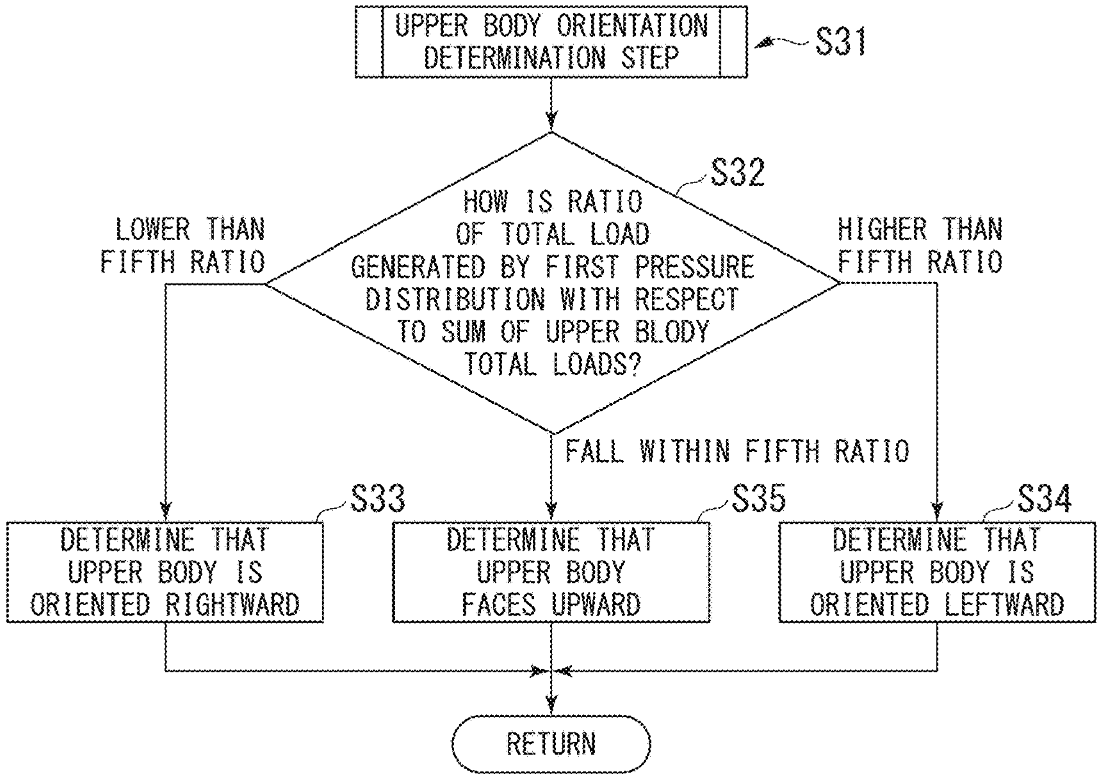
FIG. 6 is a flowchart showing an upper body orientation determination step according to the body state determination method.

In Step S31, an upper body orientation determination step is performed. As shown in FIG. 6, the determination unit 13 first compares the total load generated by the first pressure distribution which is the pressure distribution in an upper body right side region A23 with the total load generated by the second pressure distribution which is the pressure distribution in an upper body left side region A24 (Step S32).

More specifically, the determination is made, according to the ratio of the total load generated by the first pressure distribution with respect to a sum of the total load generated by the first pressure distribution and the total load generated by the second pressure distribution (hereinafter, referred to as a sum of upper body total loads).

In Step S32, when it is determined that the ratio of the total load generated by the first pressure distribution with respect to the sum of the upper body total loads is lower than the fifth ratio, the process proceeds to Step S33. In Step S32, when it is determined that the ratio of the total load generated by the first pressure distribution with respect to the sum of the upper body total loads is higher than the fifth ratio, the process proceeds to Step S 34. Then, in Step S32, when it is determined that the ratio of the total load generated by the first pressure distribution with respect to the sum of the upper body total loads falls within the fifth ratio, the process proceeds to Step S35.

In Step S33, the determination unit 13 determines that the upper body of the user P is oriented rightward. Then, Step S31 is all completed, and the process proceeds to Step S41. In Step S34, the determination unit 13 determines that the upper body of the user P is oriented leftward. Then, Step S31 is all completed, and the process proceeds to Step S41. In Step S35, the determination unit 13 determines that the upper body of the user P faces upward. Then, Step S31 is all completed, and the process proceeds to Step S41.

Figure 7:
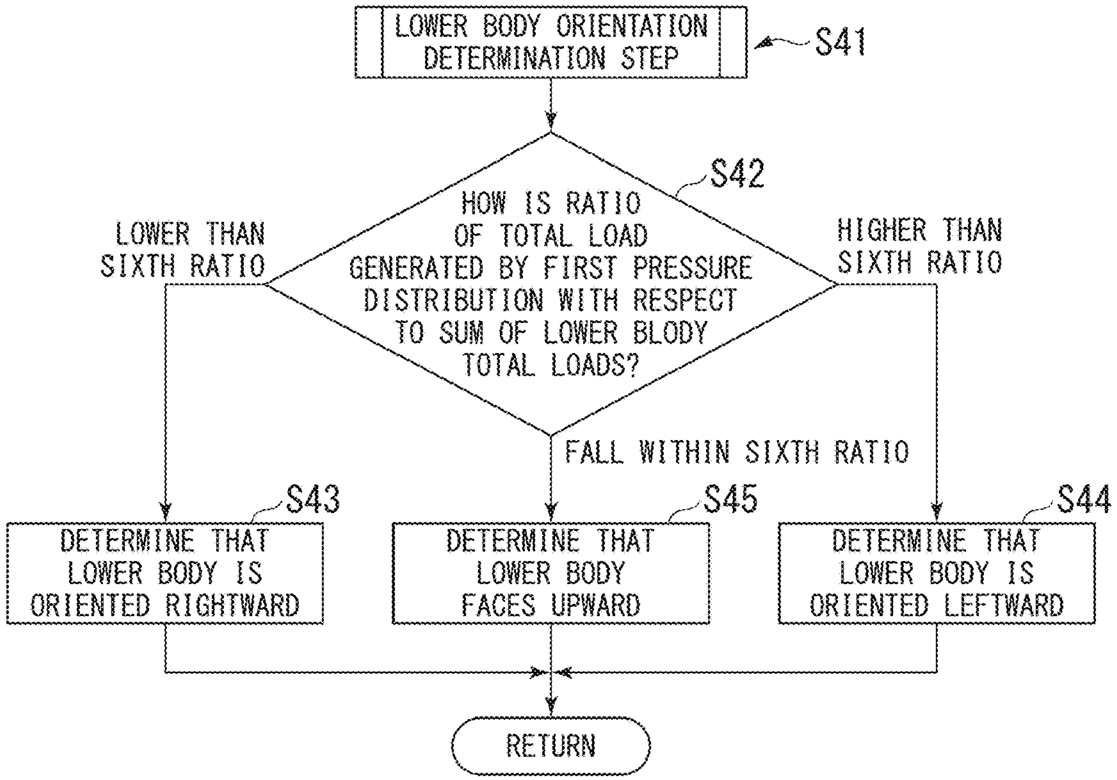
FIG. 7 is a flowchart showing a lower body orientation determination step according to the body state determination method.

In Step S41, a lower body orientation determination step is performed. As shown in FIG. 7, the determination unit 13 first compares the total load generated by the first pressure distribution which is the pressure distribution in a buttock right side region A33 with the total load generated by the second pressure distribution which is the pressure distribution in a buttock left side region A34 (Step S42). More specifically, the determination is made, according to a ratio of the total load generated by the first pressure distribution with respect to a sum of the total load generated by the first pressure distribution and the total load generated by the second pressure distribution (hereinafter, referred to as a sum of upper body total loads).

In Step S42, when it is determined that the ratio of the total load generated by the first pressure distribution with respect to the sum of the buttock total loads is lower than the sixth ratio, the process proceeds to Step S43. In Step S42, when it is determined that the ratio of the total load generated by the first pressure distribution with respect to the sum of the buttock total loads is higher than the sixth ratio, the process proceeds to Step S44. Then, in Step S42, when it is determined that the ratio of the total load generated by the first pressure distribution with respect to the sum of the buttock total loads falls within the sixth ratio, the process proceeds to Step S45.

In Step S43, the determination unit 13 determines that the lower body of the user P is oriented rightward. Then, Step S41 is all completed, and further, all steps using the body state determination method are completed. In Step S44, the determination unit 13 determines that the lower body of the user P is oriented leftward. Then, Step S41 is all completed, and further, all steps using the body state determination method are completed. In Step S45, the determination unit 13 determines that the lower body of the user P faces upward. Then, Step S41 is all completed, and further, all steps using the body state determination method are completed.

In this way, in the body state determination method according to the present embodiment, the plurality of pressure distributions formed by the body weight of the user P are detected, and the plurality of detected pressure distributions are compared with each other, thereby determining the state of the body of the user P.

For example, in the upper body orientation determination step S31, it is determined that the upper body of the user P is oriented rightward by comparing the total loads generated by the first and second pressure distributions with each other. In the lower body orientation determination step S41, it is determined that the lower body of the user P faces upward or is oriented leftward by comparing the total loads generated by the first and second pressure distributions with each other. In this manner, it is possible to determine that the body of the user P is twisted. In a case where it is determined in the upper body orientation determination step S31 that the upper body of the user P is oriented leftward, in a case where it is determined in the lower body orientation determination step S41 that the lower body of the user P faces upward or is oriented rightward, in a case where it is determined in the upper body orientation determination step S31 that the upper body of the user P faces upward, and in a case where it is determined in the lower body orientation determination step S41 that the lower body of the user P is oriented rightward or is oriented leftward, it is similarly possible to determine that the body of the user is twisted.

In accordance with the bent state and the twisted state from the horizontal position of the body of the user P, the pressure distribution formed by the acting of the user P is changed. The deviation of the pressure distribution or the pressure distribution is analyzed, thereby understanding the state where the body of the user P is bent or twisted from the horizontal position.

According to the present embodiment, in the body state determination method, all steps are performed in the kyphosis determination step S11, the lower limb contracture determination step S21, the upper body orientation determination step S31, and the lower body orientation determination step S41. However, in the body state determination method, at least one step may be performed in the kyphosis determination step S11, the lower limb contracture determination step S21, the upper body orientation determination step S31, and the lower body orientation determination step S41. The body state determination device 11 may be configured to perform at least one step in the kyphosis determination step S11, the lower limb contracture determination step S21, the upper body orientation determination step S31, and the lower body orientation determination step S41.

The determination unit 13 transmits the determined state of the body of the user P to the fluid adjustment unit 26. The determined state includes whether or not it is the kyphosis, whether or not it is the lower limb contracture, the orientation of the upper body, and the orientation of the lower body. The fluid adjustment unit 26 drives the supply/discharge unit 25, according to the determination of the determination unit 13.

Figure 8:
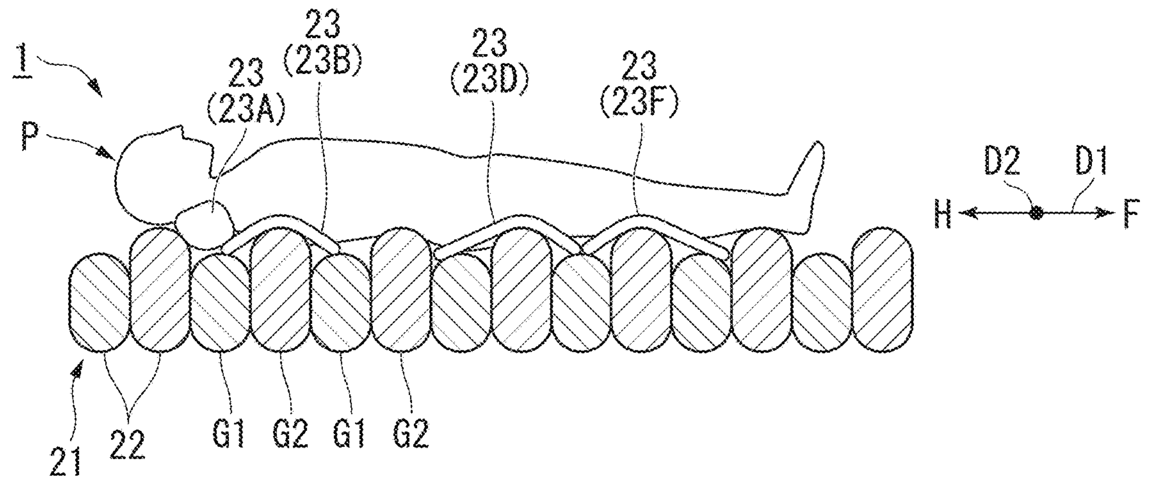
FIG. 8 is a side view showing a state where air is discharged from the inside of each main air cell of a first group.

For example, it is supposed that the determination unit 13 determines the user P to suffer the kyphosis. In this case, the fluid adjustment unit 26 inflates the auxiliary air cells 23A which are flattened (refer to FIG. 8 showing a state where the auxiliary air cells 23A are inflated), thereby bringing the auxiliary air cells 23A into contact with the neck of the user P. In this manner, the plurality of air cells 22 and 23 are caused to have a shape corresponding to the kyphosis of the user P. An area of the mat unit 21 which comes into contact with the neck of the user P spreads, and the body pressure of the user P is dispersed.

Figure 9:
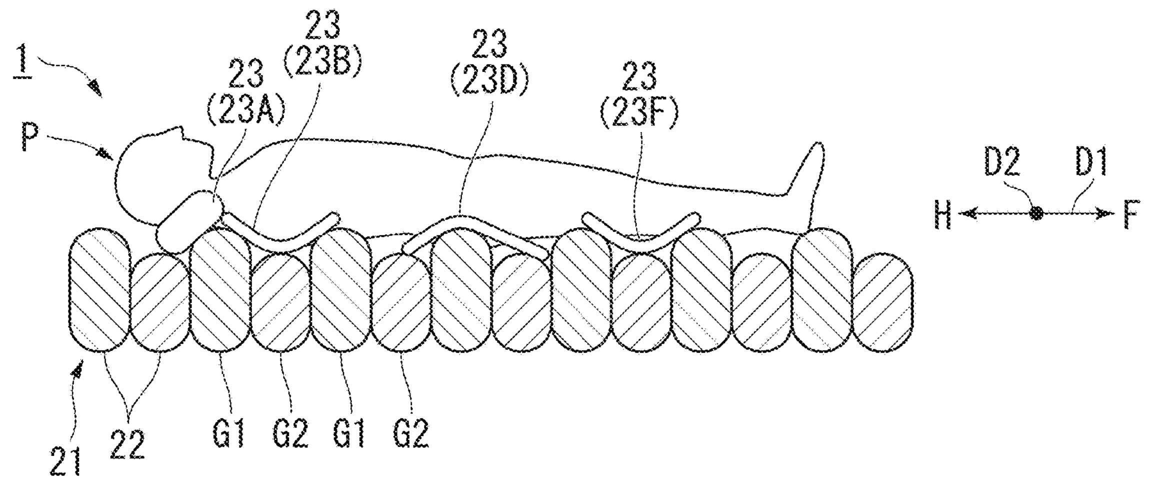
FIG. 9 is a side view showing a state where air is discharged from the inside of each main air cell of a second group.

In a state where the body pressure of the user P is dispersed, as shown in FIG. 8, the fluid adjustment unit 26 does not discharge the air from the inside of the respective main air cells 22 of the second group G2, and discharges the air from the inside the respective main air cells 22 of the first group G1, thereby lowering an upper end position of the respective main air cells 22 of the first group G1. In FIGS. 8 and 9 (to be described later), the main air cells 22 and the auxiliary air cells 23 are mainly shown in the air mat device 1.

While detecting the pressure inside the respective main air cells 22 of the first group G1, the internal pressure detection unit 51 supplies the air into the respective main air cells 22, and brings the respective main air cells 22 of the first group G1 into the initial state.

Next, as shown in FIG. 9, the fluid adjustment unit 26 does not discharge the air from the inside of the respective main air cells 22 of the first group G1, and discharges the air from the inside of the respective main air cells 22 of the second group G2, thereby lowering the upper end position of the respective main air cells 22 of the second group G2. While detecting the pressure inside the respective main air cells 22 of the second group G2, the internal pressure detection unit 51 supplies the air into the respective main air cells 22, and brings the respective main air cells 22 of the second group G2 into the initial state.

In this way, the air is alternately discharged from the main air cells 22 of the respective groups G1 and G2 (so-called alternate inflating). In this manner, it is possible to prevent the pressure from being continuously applied to the same location of the body P of the user P.

(Application Example)

Hereinafter, specific application examples according to the present invention will be described in more detail. However, the present invention is not limited to the application examples below.

Tests are performed using the air mat device 1 and the body state determination method according to the present embodiment. In the application examples, as the sensor unit 15, 144 pressure sensors 15*a* are arranged in a grid pattern along the head-foot direction D1 and 48 pressure sensors 15*a* (refer to FIG. 11) are arranged in a grid pattern along the rightward-leftward direction D2.

The ratio of the lengths in the head-foot direction D1 of the head region A1, the upper body region A2, the buttock region A3, and the foot region A4 is set to 1:2:2:4. The ratio of the lengths in the head-foot direction D1 of the first upper body region A21 and the second upper body region A22 is set to 1:1. The ratio of the lengths in the head foot direction D1 of the first foot region A41 and the second foot region A42 is set to 1:1.

Therefore, in the head-foot direction D1, the pressure sensors 15*a* of Nos. 1 to 16 belong to the head region A1. Similarly, the pressure sensors 15*a* of Nos. 17 to 48 belong to the upper body region A2. The pressure sensors 15*a* of Nos. 49 to 80 belong to the buttock region A3. The pressure sensors 15*a* of Nos. 81 to 144 belong to the foot region A4.

In the rightward-leftward direction D2, the pressure sensors 15*a* of Nos. 1 to 24 are located on the left side L, and the pressure sensors 15*a* of Nos. 25 to 48 are located on the right side R.

A range of 35% to 55% is used as the first ratio. A range of 30% to 50% is used as the second ratio. A range of 3% to 20% is used as the third ratio. A range of 0% to 10% is used as the fourth ratio. Then, a range of 45% to 55% is used as the fifth ratio and the sixth ratio.

The first to sixth ratios are not limited to these ranges, and can be set to a proper range.

(1. Evaluation on Kyphosis, Lower Limb Contracture, and Orientation of Upper Body and Lower Body)

[Sample 1]

Figure 10:
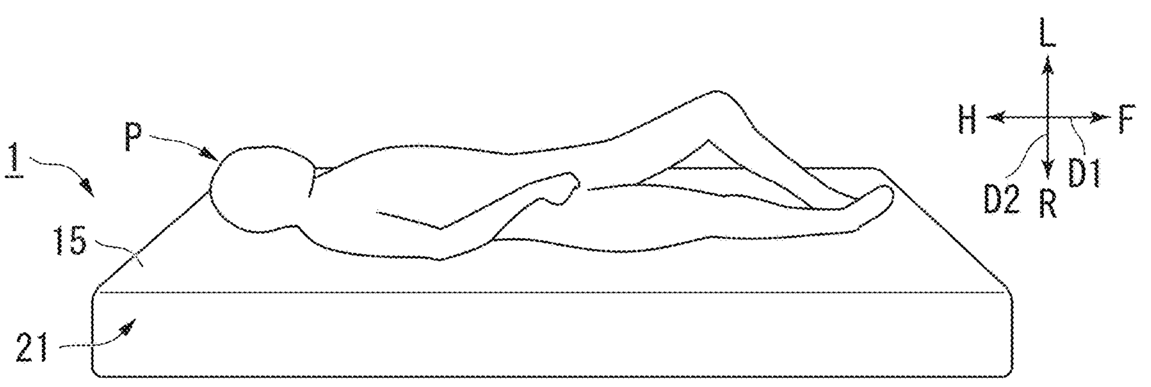
FIG. 10 is a perspective view showing a state of a user who sleeps on a sensor unit according to an application example.

The kyphosis, the lower limb contracture, and the orientation of the upper body and the lower body of the user P are evaluated. As shown in FIG. 10, the user P is caused to sleep at the supine position (to lie down) on the sensor unit 15 of the air mat device 1. In FIGS. 10, and 13, 15, 17, and 19 (to be described later), the air mat device 1 mainly shows only a relevant configuration. The user P slightly suffers the kyphosis and the lower limb contracture. The user P sleeps in a state where the upper body faces upward and the lower body is oriented rightward.

The pressure distribution detected by the pressure distribution detection unit 12 is shown in FIG. 11. In FIG. 11, a portion from which pressure of approximately 0 Pa is detected is shown in a white color, and the portion is shown in a dark gray color as the detected pressure becomes higher. This illustration is also applied to FIGS. 12, 14, 16, 18, and 20 (to be described later).

In accordance with the bent state and the twisted state from the horizontal position of the body of the user P, the pressure distribution formed by the body weight of the user P is changed.

According to the detected pressure distribution of the user P, the pressure distribution detection unit 12 performs calculation as follows. The parentheses internally indicate a ratio with respect to the body weight of the user P.

Body Weight of User P: 43.6 kg

Load Acting on Head Region A1: 3.5 kg (8%)

Load Acting on Upper Body Region A2: 18.3 kg (42%)

Load Acting on First Upper Body Region A21: 6.0 kg (14%)

Load Acting on Second Upper Body Region A22: 12.3 kg (28%)

Total Load Generated by Pressure Distribution in Upper Body Right Side Region A23: 9.1 kg (21%)

Total Load Generated by Pressure Distribution in Upper Body Left Side Region A24: 9.2 kg (21%)

Load Acting on Buttock Region A3: 18.7 kg (43%)

Total Load Generated by Pressure Distribution in Buttock Right Side Region A33: 6.3 kg (14%)

Total Load Generated by Pressure Distribution in Buttock Left Side Region A34: 12.4 kg (29%)

Load Acting on Foot Region A4: 3.0 kg (7%)

The total load generated by the second upper body pressure distribution is higher than the total load generated by the first upper body pressure distribution. Accordingly, it is determined as YES in Step S12 of the body state determination method, thereby determining that the user P suffers the kyphosis.

As shown in FIG. 11, the first foot pressure distribution and the second foot pressure distribution are respectively greater than 0 Pa at any position. Accordingly, it is determined as NO in Step S22. The load of 7% (fourth ratio is 0% to 10%) of the body weight is distributed in the foot region A4. Accordingly, it is determined as YES in Step S24, thereby determining that the user P suffers the lower limb contracture.

The ratio of the total load generated by the first pressure distribution with respect to the sum of the upper body total loads is 50% (fifth ratio is 45% to 55%). Accordingly, in Step S32, it is determined that the ratio of the total load generated by the first pressure distribution with respect to the sum of the upper body total loads falls within the fifth ratio, thereby determining that the upper body of the user P faces upward.

The ratio of the total load generated by the first pressure distribution with respect to the sum of the buttock total loads is 34% (sixth ratio is 45% to 55%). Accordingly, in Step S42, it is determined that the ratio of the total load generated by the first pressure distribution with respect to the sum of the buttock total loads is lower than the sixth ratio, thereby determining that the upper body of the user P is oriented rightward.

According to these results of determining the state of the user P by using the determination unit 13, it is understood that it is possible to properly determine a posture of the user P sleeping on the sensor unit 15, for example, a state of the user P such as the kyphosis, the lower limb contracture, and the orientation of the upper body and the lower body.

When it is determined that the upper body of the user P faces upward and the lower body is oriented leftward, it is understood that an axis of the body of the user P is twisted.

In this case, for example, the fluid adjustment unit 26 may inflate auxiliary air cells 23E or auxiliary air cells 23G so that the lower body of the user P faces upward. In this way, the axis of the body of the user P is no longer twisted, and the posture of the user P can be corrected.

[Sample 2]

Figure 12:
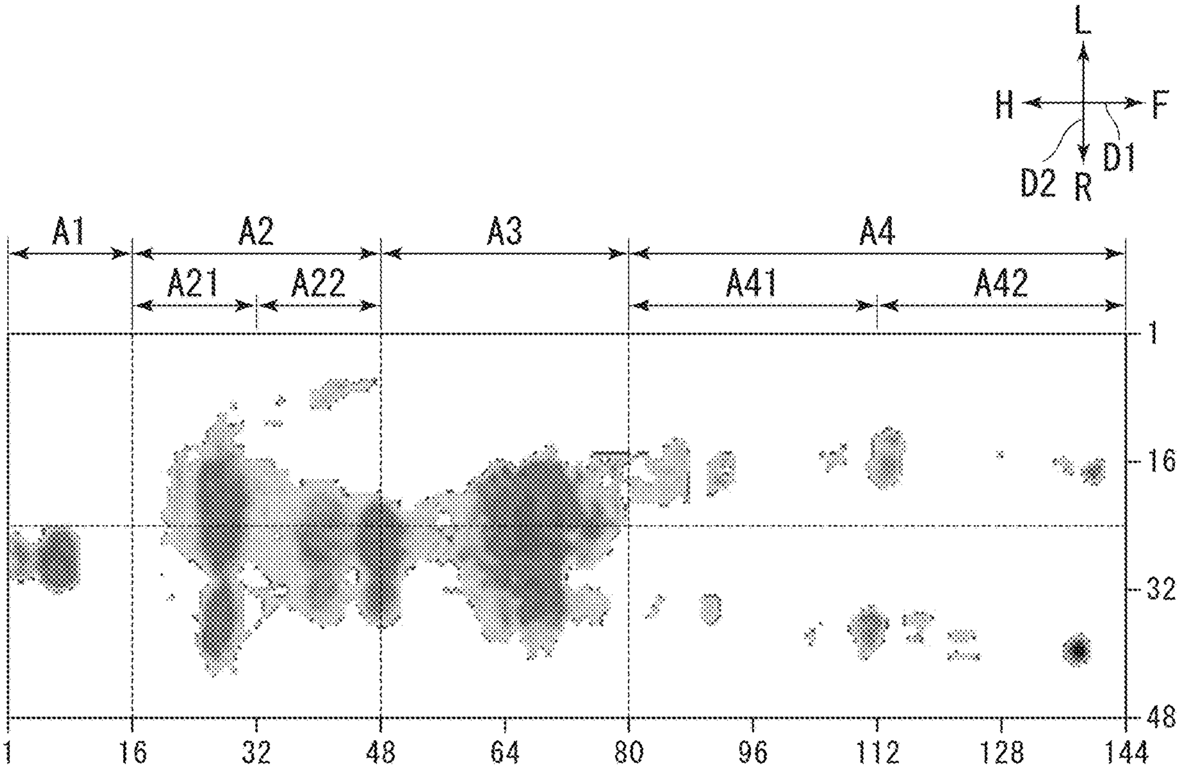
FIG. 12 is a view showing a pressure distribution of another user which is detected by the pressure distribution detection unit.

Although a state where the user P sleeps is not shown, the user P does not suffer the kyphosis and the lower limb contracture. The user P sleeps in a state where the upper body faces upward and the lower body faces upward. The pressure distribution detected by the pressure distribution detection unit 12 is shown in FIG. 12.

According to the detected pressure distribution of the user P, the pressure distribution detection unit 12 performs calculation as follows.

Body Weight of User P: 59 kg

Load Acting on Head Region A1: 3.3 kg (6%)

Load Acting on Upper Body Region A2: 23.8 kg (40%)

Load Acting on First Upper Body Region A21: 12.4 kg (21%)

Load Acting on Second Upper Body Region A22: 11.4 kg (19%)

Total Load Generated by Pressure Distribution in Upper Body Right Side Region A23: 12.2 kg (21%)

Total Load Generated by Pressure Distribution in Upper Body Left Side Region A24: 11.6 kg (20%)

Load Acting on Buttock Region A3: 25.2 kg (43%)

Total Load Generated by Pressure Distribution in Buttock Right Side Region A33: 12.9 kg (22%)

Total Load Generated by Pressure Distribution in Buttock Left Side Region A34: 12.3 kg (21%)

Load Acting on Foot Region A4: 6.8 kg (12%)

The total load generated by the second upper body pressure distribution is not higher than the total load generated by the first upper body pressure distribution. Accordingly, it is determined as NO in Step S12 of the body state determination method, thereby determining that the user P does not suffer the kyphosis.

As shown in FIG. 12, the first foot pressure distribution and the second foot pressure distribution are respectively greater than 0 Pa at any position. Accordingly, it is determined as NO in Step S22. The load of 12% (fourth ratio is 0% to 10%) of the body weight is distributed in the foot region A4. Accordingly, it is determined as NO in Step S24, thereby determining that the user P does not suffer the lower limb contracture.

The ratio of the total load generated by the first pressure distribution with respect to the sum of the upper body total loads is 51% (fifth ratio is 45% to 55%). Accordingly, in Step S32, it is determined that the ratio of the total load generated by the first pressure distribution with respect to the sum of the upper body total loads falls within the fifth ratio, thereby determining that the upper body of the user P faces upward.

The ratio of the total load generated by the first pressure distribution with respect to the sum of the buttock total loads is 51% (sixth ratio is 45% to 55%). Accordingly, in Step S42, it is determined that the ratio of the total load generated by the first pressure distribution with respect to the sum of the buttock total loads falls within the sixth ratio, thereby determining that the upper body of the user P faces upward.

According to these results of determining the state of the user P by using the determination unit 13, it is understood that it is possible to properly determine the state of the user P sleeping on the sensor unit 15, such as the kyphosis, the lower limb contracture, and the orientation of the upper body and the lower body.

(2. Correspondence Example after Determining Kyphosis)

Figure 13:
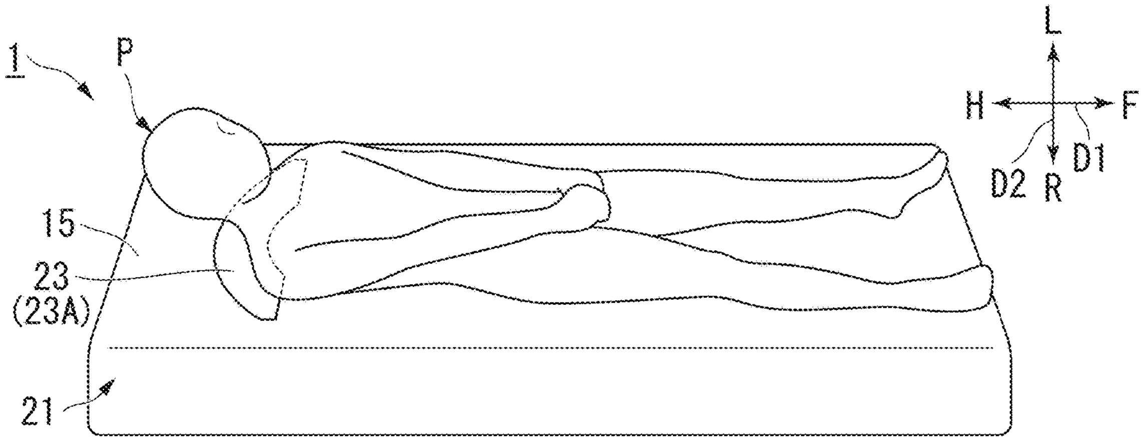
FIG. 13 is a perspective view showing a state of a user who suffers a kyphosis and sleeps on the sensor unit before an auxiliary air cell is inflated according to an application example.

As shown in FIG. 13, the user P who suffers the kyphosis is caused to sleep at the supine position on the sensor unit 15 of the air mat device 1. The respective main air cells 22 and the respective auxiliary air cells 23 are in the above-described initial state.

Figure 14:
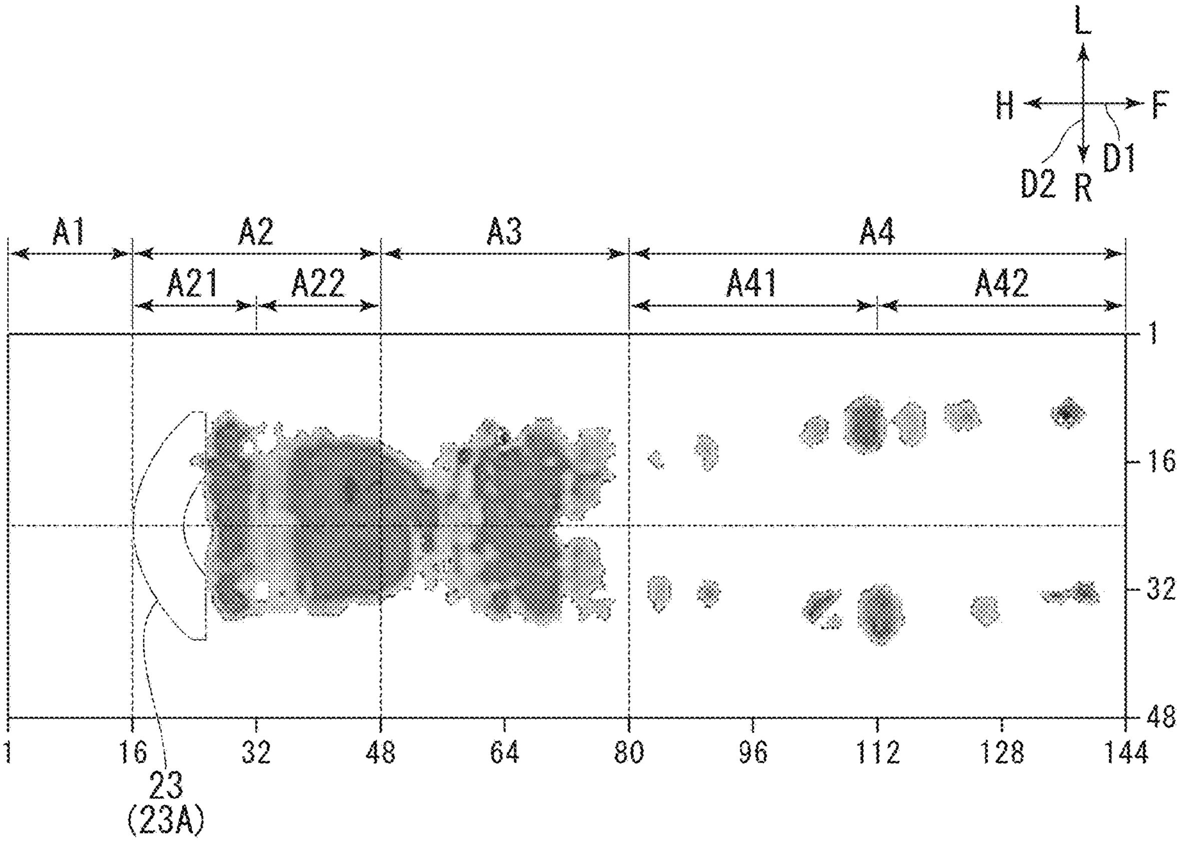
FIG. 14 is a view showing a pressure distribution detected by the pressure distribution detection unit.
Figure 16:
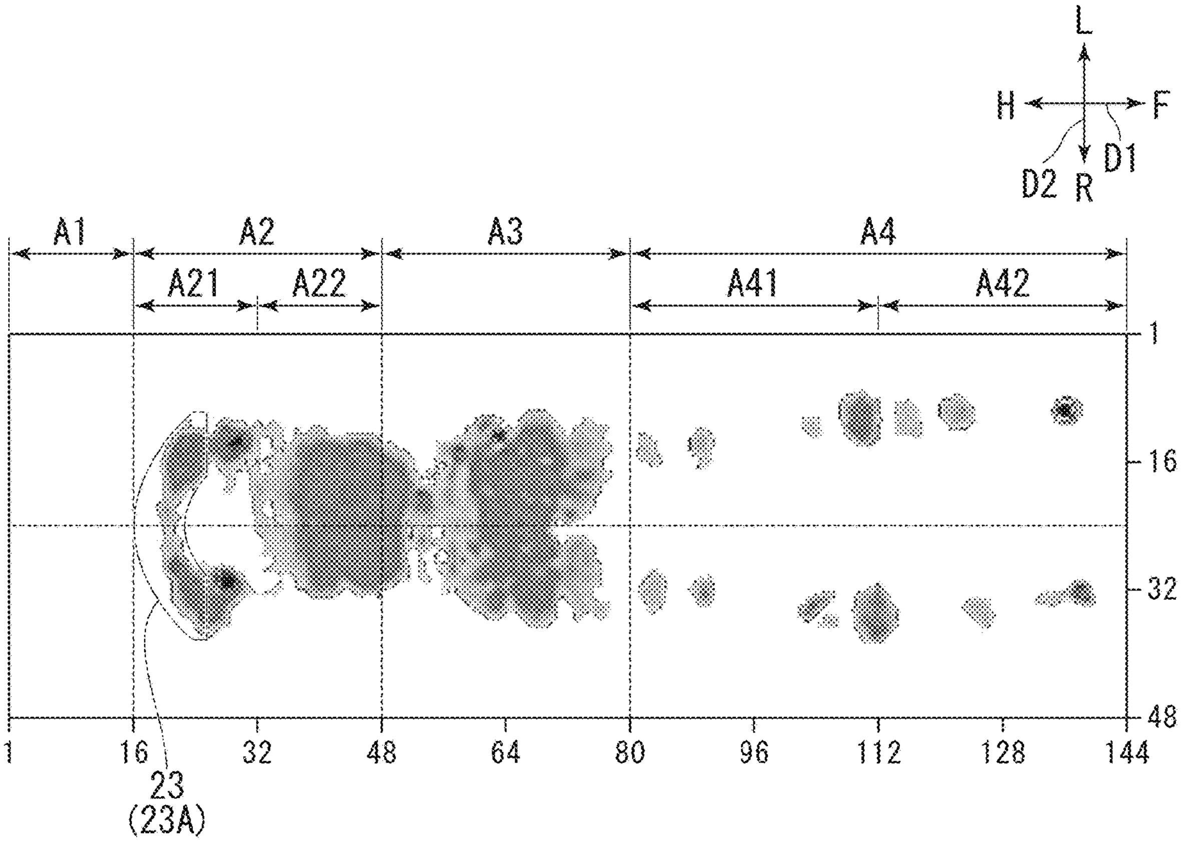
FIG. 16 is a view showing a pressure distribution detected by the pressure distribution detection unit.

In this case, the pressure distribution detected by the pressure distribution detection unit 12 is shown in FIG. 14. In FIGS. 14 and 16 (to be described later), the position of the auxiliary air cell 23A is shown. The maximum value of the pressure detected by the pressure distribution detection unit 12 is 45.7 mmHg (1 mmHg is 133.3 Pa (Pascal)).

Figure 15:
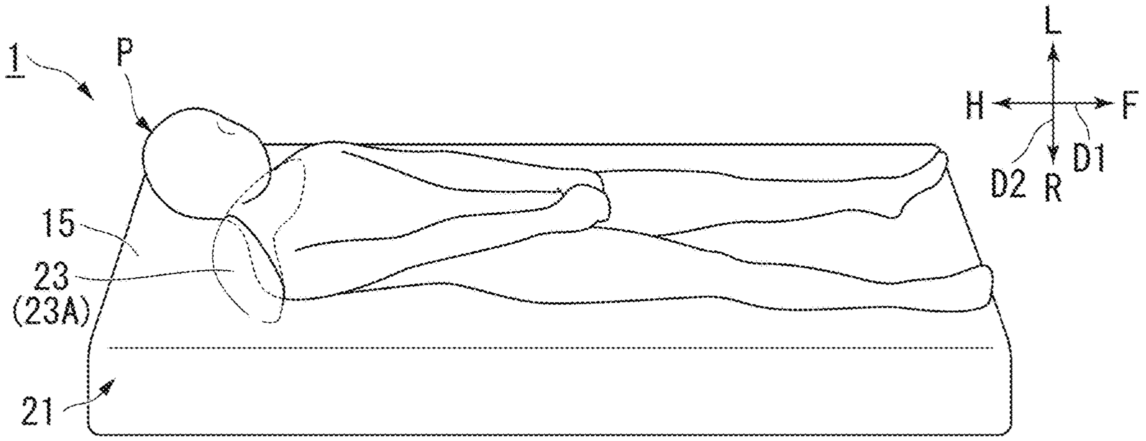
FIG. 15 is a perspective view showing a state of the user who suffers the kyphosis and sleeps on the sensor unit after the auxiliary air cell is inflated.

As shown in FIG. 15, the auxiliary air cell 23A is inflated, and the auxiliary air cell 23A is brought into contact with the neck of the user P. In this case, the pressure distribution detected by the pressure distribution detection unit 12 is shown in FIG. 16. The maximum value of the pressure detected by the pressure distribution detection unit 12 is lowered to 40.1 mmHg. It is understood that the body pressure of the user P is dispersed.

(3. Correspondence Example after Determining Lower Limb Contracture)

Figure 17:
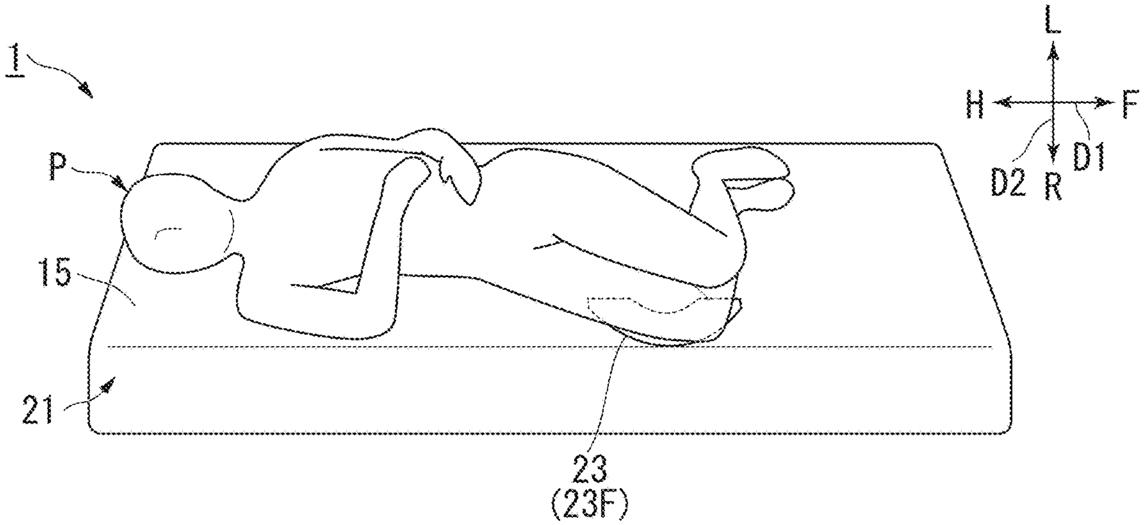
FIG. 17 is a perspective view showing a state of a user who suffers a lower limb contracture and sleeps on the sensor unit before the auxiliary air cell is inflated according to an application example.

As shown in FIG. 17, the user P who suffers the lower limb contracture is caused to sleep at the supine position on the sensor unit 15 of the air mat device 1. The respective main air cells 22 and the respective auxiliary air cells 23 are in the above-described initial state.

Figure 18:
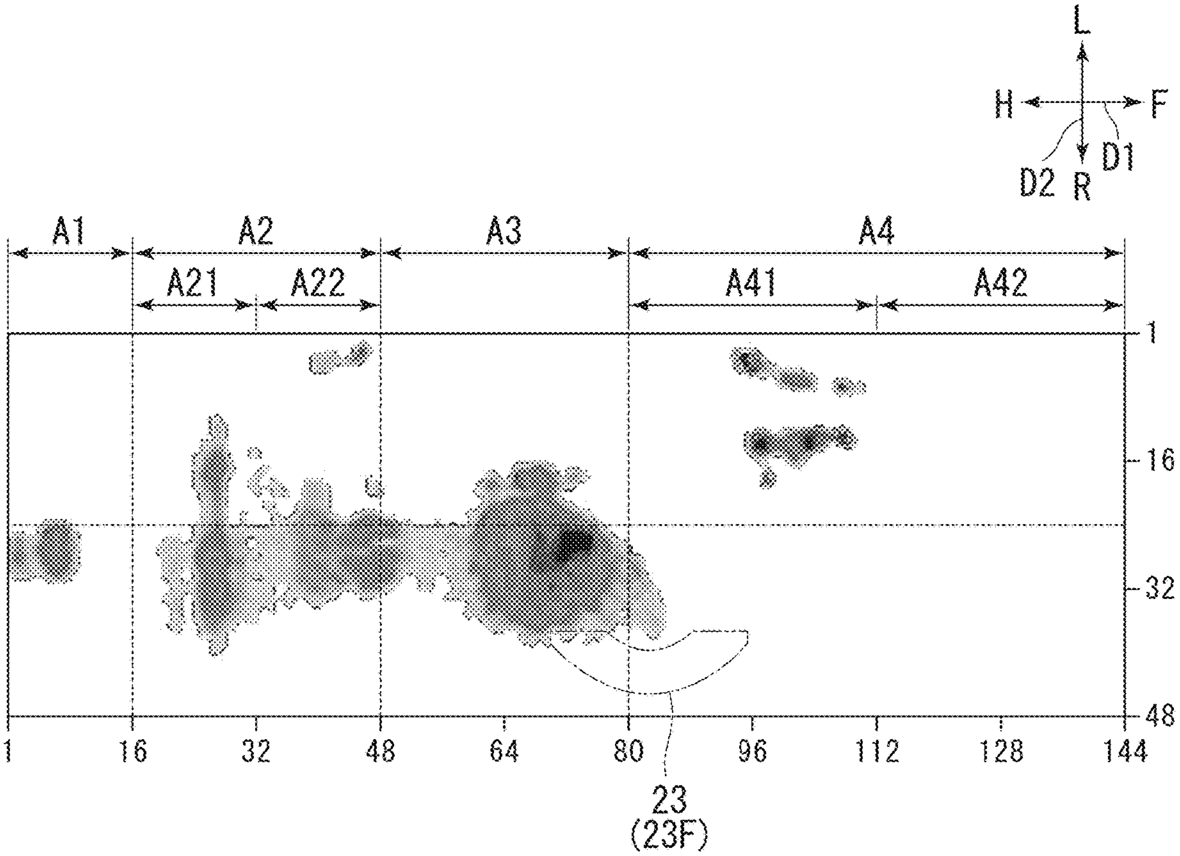
FIG. 18 is a view showing a pressure distribution detected by the pressure distribution detection unit.
Figure 20:
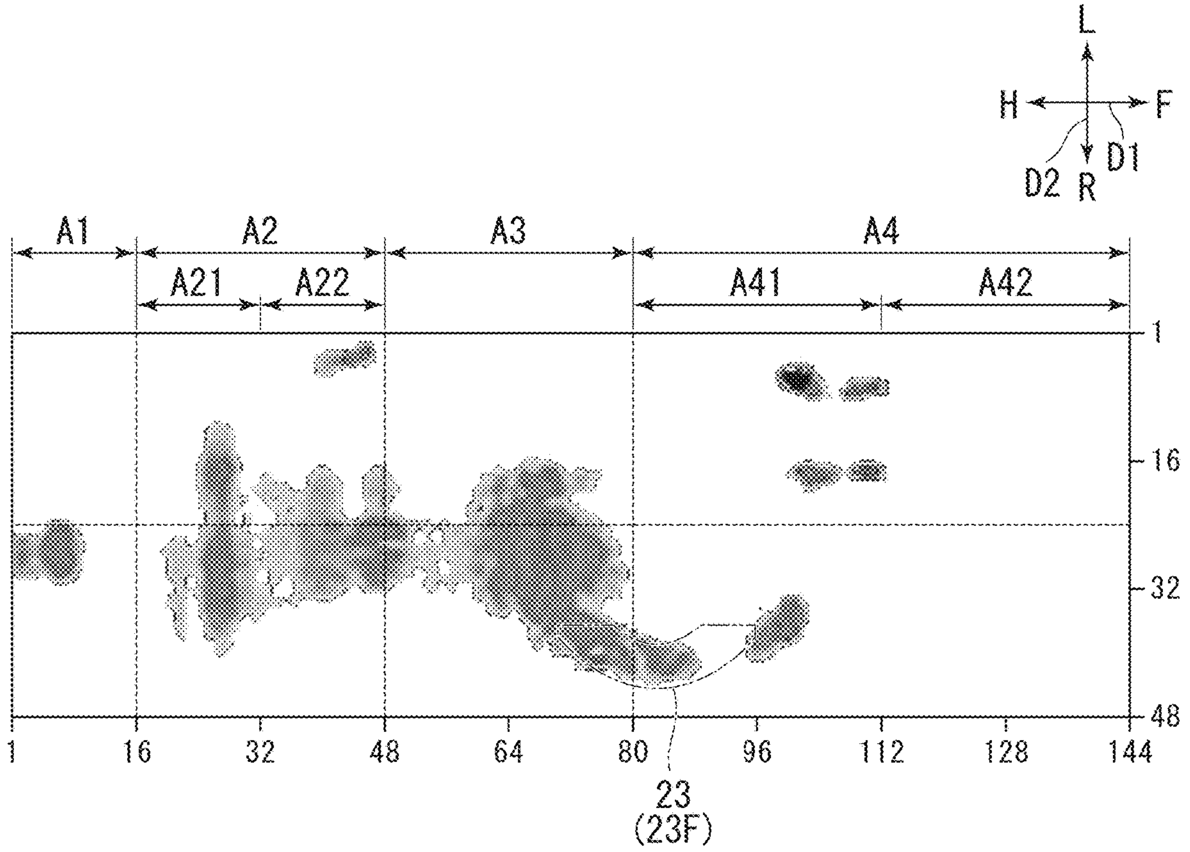
FIG. 20 is a view showing a pressure distribution detected by the pressure distribution detection unit.

In this case, the pressure distribution detected by the pressure distribution detection unit 12 is shown in FIG. 18. FIGS. 18 and 20 (to be described later) show a position of the auxiliary air cell 23F. The maximum value of the pressure detected by the pressure distribution detection unit 12 is 54 mmHg.

Figure 19:
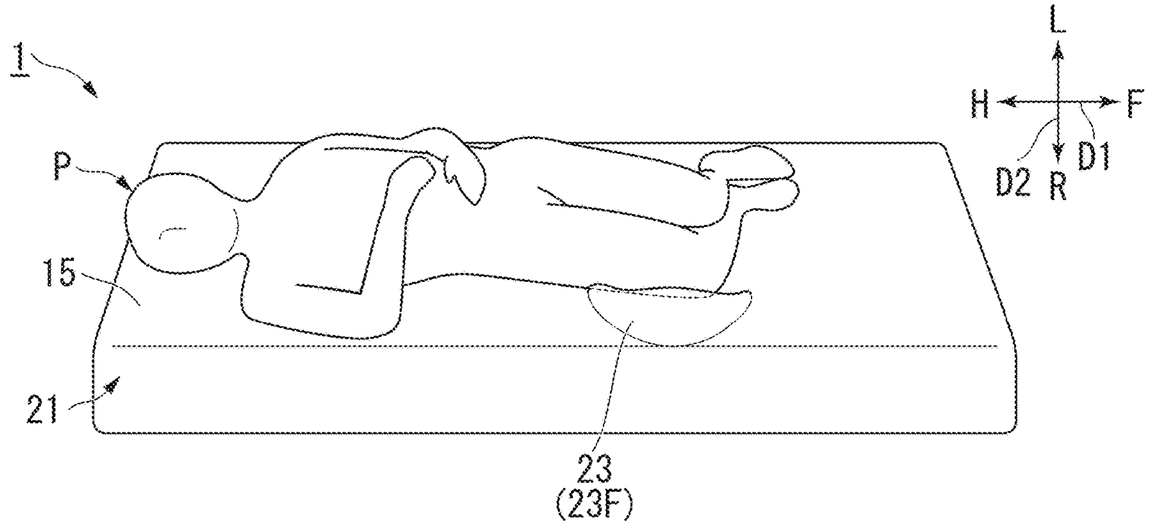
FIG. 19 is a perspective view showing a state of the user who suffers the lower limb contracture and sleeps on the sensor unit after the auxiliary air cell is inflated.

As shown in FIG. 19, the auxiliary air cell 23F is inflated, and the auxiliary air cell 23F is brought into contact with the knee of the user P. In this case, the pressure distribution detected by the pressure distribution detection unit 12 is shown in FIG. 20. The maximum value of the pressure detected by the pressure distribution detection unit 12 is lowered to 41.1 mmHg. It is understood that the body pressure of the user P is dispersed.

Furthermore, the twisted axis of the body of the user P is improved, and the muscle tension caused by the twisted axis is relieved. Accordingly, contracture progress can be suppressed.

As described above, according to the body state determination device 11 and the body state determination method of the present embodiment, for example, two pressure distributions such as the first upper body pressure distribution and the second upper body pressure distribution are compared with each other. In this manner, compared to a case where the determination is made according to one pressure distribution, the state of the body of the user P such as the kyphosis can be more accurately determined.

If the state of the body is recognized, the mat unit 21 for supporting the body is deformed according to the determination result. In this manner, the body pressure can be dispersed so as to reduce the maximum value of the body pressure of the user P, or the posture of the user P can be corrected.

The first upper body pressure distribution and the second upper body pressure distribution are the pressure distributions in mutually different regions at the same time. In this manner, the state of the body of the user P at the same time can be accurately determined over a wider range of the body.

The pressure distribution detection unit 12 detects the pressure distribution for each of regions A1, A2, A3, and A4 located along the head-foot direction D1. Therefore, the state of the body of the user P can be detected for each of the plurality of regions A1, A2, A3, and A4.

The plurality of regions A1, A2, A3, and A4 include at least one of the head region A1, the upper body region A2, the buttock region A3, and the foot region A4. Therefore, the pressure distributions of the user P are detected by separately detecting the pressure distributions of the user P in the head, the upper body other than the head, the buttock, and the foot. In this manner, the state of the body of the user P can be determined for each pressure distribution of the head of the user P.

When the determination unit 13 detects that the first foot pressure distribution is greater than 0 Pa at any position and the first foot pressure distribution is equal to 0 Pa at any position, the determination unit 13 determines that the state of the body of the user P shows the lower limb contracture. Therefore, according to the range from which the pressure is detected by the pressure distribution detection unit 12 in the foot region A4, it is possible to determine that the state of the body of the user P shows the lower limb contracture.

When the determination unit 13 detects that the total load generated by the second upper body pressure distribution is higher than the total load generated by the first upper body pressure distribution, the determination unit 13 determines that the state of the body of the user P shows the kyphosis. In this manner, according to the deviation in the head-foot direction D1 of the total load in the upper body region A2 detected by the pressure distribution detection unit 12, it is possible to determine that the state of the body of the user P shows the kyphosis.

According to a magnitude relationship between the total loads generated by the respective pressure distributions in the rightward-leftward direction D2 of the upper body region A2 and the buttock region A3 which are detected by the pressure distribution detection unit 12, the determination unit 13 can determine the orientation of the user P in the upper body region A2 and the buttock region A3.

In addition, according to the air mat device 1 of the present embodiment, the mat unit 21 includes the pressure distribution detection unit 12. Accordingly, the pressure distribution can be detected in a stabilized state.

The support unit is the mat unit 21 having the plurality of air cells 22 and 23, and the air mat device 1 further includes the supply/discharge unit 25 and the fluid adjustment unit 26. The fluid adjustment unit 26 drives the supply/discharge unit 25, according to the determination of the determination unit 13. In this manner, the plurality of air cells 22 and 23 can have a shape adaptable to the state of the body of the user P.

The mat unit 21 has the pressure distribution detection unit 12. However, the mat unit 21 may be configured to have the pressure distribution detection unit 12 and the determination unit 13. That is, the mat unit 21 may be configured to have the body state determination device 11.

Second Embodiment

Next, a second embodiment according to the present invention will be described with reference to FIG. 21. The same reference numerals will be given to elements which are the same as those according to the above-described embodiment, and a description thereof will be omitted. Only different points will be described.

Figure 21:
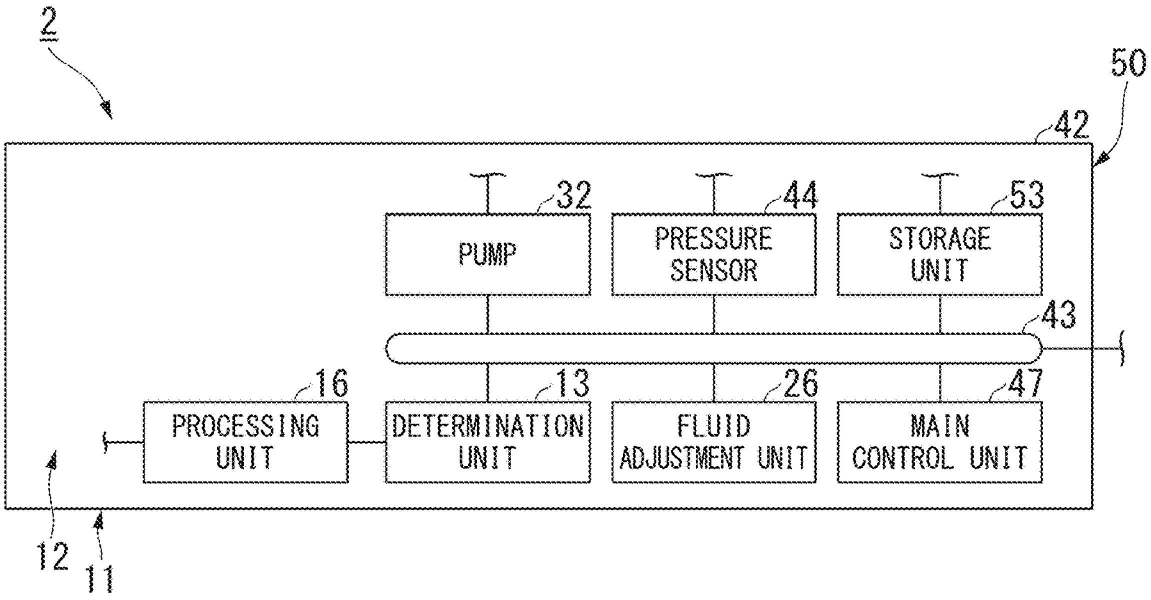
FIG. 21 is a block diagram showing a schematic configuration of a main unit in an air mat device according to a second embodiment of the present invention.

As shown in FIG. 21, the air mat device 2 according to the present embodiment includes a storage unit 53 in addition to each configuration according to the first embodiment. The storage unit 53 has a memory, and is connected to the bus 43.

The storage unit 53 stores the pressure distribution in the head region A1 which is formed due to the own weight of the body of the user who sleeps on the sensor unit 15 of the air mat device 2.

The user whose pressure distribution is stored may be a person the same as the above-described user P, or may be a person different from the user P.

Next, the body state determination method and an operation of the air mat device 2 according to the present embodiment will be described.

If the user P sleeps on the sensor unit 15, the pressure distribution detection unit 12 detects the pressure distribution in the head region A1 which is formed due to the own weight of the body of the user P. The detected pressure distribution in the head region A1 is stored in the storage unit 53.

If a certain period of time elapses, the pressure distribution detection unit 12 detects the pressure distribution in the head region A1 which is formed due to the own weight of the body of the user P.

According to (in comparison between) the pressure distribution in the upper body region A2 which is newly detected and the pressure distribution in the upper body region A2 which is stored in the storage unit 53, the determination unit 13 determines a time-dependent change in the posture, which shows the state of the body of the user P. In this case, both the pressure distributions are pressure distributions acquired at mutually different times from the same site such as the upper body region A2 in the body of the user P.

In the present embodiment, the region for detecting the pressure distribution is not limited to the upper body region A2, and may be the head region A1 or the buttock region A3.

As described above, according to the body state determination device 11 and the air mat device 2 of the present embodiment, according to the pressure distributions acquired from the same site at mutually different times, it is possible to accurately determine the time-dependent change in the state of the upper body (site of the user P which corresponds to the upper body region A2) other than the head of the body of the user P.

In the present embodiment, the storage unit 53 may be configured to store a bundle of information items in which the respective pressure distributions are combined with the detected times of the pressure distributions.

That is, for example, when the pressure distribution detection unit 12 detects a pressure distribution Q1 of the user P at a first time t1, the storage unit 53 stores a bundle of information items (t1 and Q1) in which the first time t1 and the pressure distribution Q1 are combined with each other. When the pressure distribution detection unit 12 detects a pressure distribution Q2 of the user P at a second time t2 later than the first time t1, the storage unit 53 stores a bundle of information items (t2 and Q2) in which the second time t2 and the pressure distribution Q2 are combined with each other. For example, the pressure distribution Q1 and the pressure distribution Q2 are the pressure distributions acquired from the same region such as the upper body region A2.

In this case, the determination unit 13 may determine the state of the body of the user P, according to a change rate obtained in such a way that a change amount of the pressure distribution Q2 from the pressure distribution Q1 is divided by a time difference. The time difference is a difference (t2−t1) between the second time t2 and the first time t1.

In this way, the determination unit 13 determines the state of the body. Accordingly, it is possible to recognize the change rate of the pressure distributions of the region such as the upper body region A2, and it is possible to determine changing speed of the state of the body of the user P such as the speed at which the user P changes the orientation of the body.

Hitherto, the first embodiment and the second embodiment according to the present invention have been described in detail with reference to the drawings. The specific configurations are not limited to the embodiments, and include modifications, combinations, and deletions of the configurations within the scope not departing from the gist of the present invention. Furthermore, as a matter of course, the configurations described in the respective embodiments can be utilized by being appropriately combined with each other.

For example, in the embodiments, the air is used as the fluid. However, the fluid is not limited to the air, and may be water or oil.

Figure 22A:
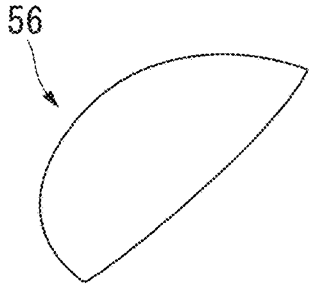
FIG. 22A is a view for describing an auxiliary air cell according to a modification example of the present invention.
Figure 22B:
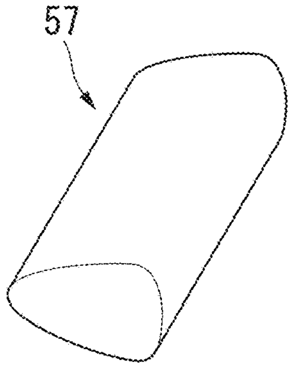
FIG. 22B is a view for describing an auxiliary air cell according to a modification example of the present invention.

The shape of the auxiliary air cell 23 is set to have the crescent shape. However, the shape of the auxiliary air cell 23 is not particularly limited. For example, as shown in FIG. 22A, an auxiliary air cell 56 may have a semicircular shape. Although not shown, the auxiliary air cell may have a rectangular shape or an L-shape (boomerang shape) in addition to this shape. As shown in FIG. 22B, an auxiliary air cell 57 may have a triangular prism shape. Although not shown, the auxiliary air cell may have a columnar shape or a semi-columnar shape in addition to this shape.

Figure 22C:
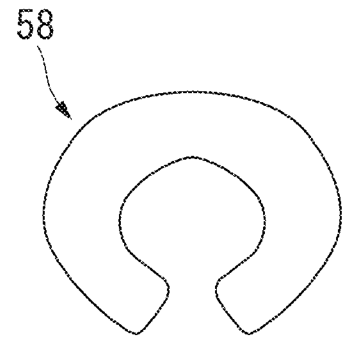
FIG. 22C is a view for describing an auxiliary air cell according to a modification example of the present invention.
Figure 22D:
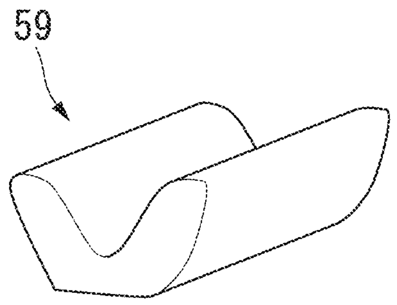
FIG. 22D is a view for describing an auxiliary air cell according to a modification example of the present invention.

As shown in FIG. 22C, an auxiliary air cell 58 may have a C-shape. Although not shown, the auxiliary air cell may have a round shape, an O-shape, or a recess shape in addition to this shape. As shown in FIG. 22D, an auxiliary air cell 59 may have a V-shape (semi-cylindrical shape). Although not shown, the auxiliary air cell may have a mountain letter shape in addition to this shape.

As the body support device, the air mat device is used. However, the body support device is not limited thereto, and may be a chair or a robot used for nursing care. For example, it is supposed that the body support device is the robot and the robot has the head, the body, the right arm, and the left arm. Then, the left arm supports the upper body other than the head of the user P, and the right arm supports the buttock and the foot of the user. In this case, the load acting on the chest of the user can be detected by the left arm, and the load acting on the buttock and the foot can be detected by the right arm. The number of arms included in the robot is increased, and the respective arms support each of the head of the user, the upper body other than the head, the buttock, and the foot of the user. In this manner, similar to the body state determination device according to the present embodiment, the loads acting on the user can be separately detected.

For example, in a case where the body support device is the robot, the body state determination device determines at least one of the bent state and the twisted state from a standing position of the body of the user. The standing position described herein means a state where the body stretches along a vertical direction.

The same configuration is applied to a case where the body support device is the chair.

Hitherto, the preferred embodiments according to the present invention have been described. However, the present invention is not limited to only the embodiments and modification examples thereof. Additions, omissions, substitutions, and other modifications in the configurations can be made within the scope not departing from the gist of the present invention.

In addition, the present invention is not limited by the above description, and is limited only by the appended claims.

INDUSTRIAL APPLICABILITY

According to the body state determination device, the body support device, and the body state determination method in the above-described respective embodiments, the state of the body of the user can be accurately determined.

REFERENCE SIGNS LIST

1: air mat device (body support device)
11: body state determination device
12: pressure distribution detection unit (detection unit)
13: determination unit
21: mat unit (support unit)
22: main air cell (fluid cell)
23, 56, 57, 58, 59: auxiliary air cell (fluid cell)
25: supply/discharge unit
26: fluid adjustment unit
A1: head region
A2: upper body region
A3: buttock region
A4: foot region
D1: head-foot direction (first direction)
D2: rightward-leftward direction (second direction)
L: left side (other side)
P: user
P2, P3: pressure center position
R: right side (one side)

What is claimed is:

1. A body state determination device comprising:

a first mat having a head side (H), a foot side (F), a left side (L) and a right side (R), wherein a central axis runs from H to F along a midline, parallel to the L and/or R, of the first mat;

a sensor that is configured to detect a plurality of pressure distributions formed by a body weight of a user;

a second mat comprised of one or more crescent-shaped fluid cells and a third mat comprised of one or more crescent-shaped fluid cells; and a controller configured to determine a state of a body of the user by comparing the plurality of pressure distributions detected by the sensor, the state of the body of the user including at least one of a first state the user has a lower limb contracture, a second state that the user has a kyphosis, wherein at least one of the crescent-shaped fluid cells of the second mat or the crescent-shaped fluid cells of the third mat have a recess that faces toward the central axis of the first mat, and wherein the controller is configured to inflate the second mat if the controller determines the user is in the first state, and the controller configured to inflate the third mat if the controller determines the user is in the second state.

2. The body state determination device according to claim 1, wherein the plurality of pressure distributions are pressure distributions acquired from mutually different sites of the body of the user at the same time.

3. The body state determination device according to claim 2, wherein the sensor is configured to detect the pressure distribution for each of a plurality of regions along a first direction, while supporting the body weight of the user lying along the first direction.

4. The body state determination device according to claim 3, wherein the plurality of regions include at least one of the group consisting of a head region, an upper body region, a buttock region, and a foot region.

5. The body state determination device according to claim 4, wherein in a case where the pressure distribution of a region which is positioned closer to the buttock region than a central portion of the foot region in the first direction is defined as a first foot pressure distribution, and further in a case where the pressure distribution of a region which is positioned closer to a side opposite to the buttock region than the central portion of the foot region is defined as a second foot pressure distribution, when the sensor detects that the first foot pressure distribution is greater than 0 Pa at any position and that the second foot pressure distribution is equal to 0 Pa at any position, the controller is configured to determine that the state of the body of the user shows the lower limb contracture.

6. The body state determination device according to claim 4, wherein in a case where the pressure distribution of a region that is positioned closer to the head region than a central portion of the upper body region in the first direction is defined as a first upper body pressure distribution, and further in a case where the pressure distribution of a region that is positioned closer to the buttock region than the central portion of the upper body region is defined as a second upper body pressure distribution, when the sensor detects that a total load generated by the second upper body pressure distribution is higher than a total load generated by the first upper body pressure distribution, the controller is configured to determine that the state of the body of the user shows the kyphosis.

7. The body state determination device according to claim 4, wherein in a case where a direction extending along the sensor and perpendicular to the first direction is defined as a second direction, and further in a case where the pressure distributions on respective sides in the second direction with respect to a pressure center position in the region are defined as a first pressure distribution and a second pressure distribution, the controller is configured to determine an orientation of the user in the region, according to a total load generated by the first pressure distribution and a total load generated by the second pressure distribution.

8. The body state determination device according to claim 1, wherein the plurality of pressure distributions are pressure distributions acquired from a same site of the body of the user at mutually different times.

9. The body state determination device according to claim 8, wherein the controller is configured to determine the state of the body of the user, according to a change rate obtained in such a way that a change amount of the plurality of pressure distributions is divided by a time difference.

10. A body state determination method comprising:

providing a body state determination device, said body state determination device comprising a first mat, said first mat having a head side (H), a foot side (F), a left side (L) and a right side (R), wherein a central axis runs from H to F along a midline, parallel to the L and/or R, of the first mat, a sensor, a second mat comprised of one or more crescent-shaped fluid cells, a third mat comprised of one or more crescent-shaped fluid cells, and a controller in communication with the sensor, wherein at least one of the crescent-shaped fluid cells of the second mat or the crescent-shaped fluid cells of the third mat have a recess that faces toward the central axis of the first mat;

detecting, by the sensor, a plurality of pressure distributions formed by a body weight of a user; and determining, by the controller, a state of a body of the user by comparing the plurality of detected pressure distributions with each other, wherein the state of the body of the user comprises at least one of a first state that the user has a lower limb contracture, and a second state that the user has a kyphosis, wherein the controller is configured to inflate the second mat if the controller determines the user is in the first state, and the controller configured to inflate the third mat if the controller determines the user is in the second state.

11. The method according to claim 10, wherein the plurality of pressure distributions are pressure distributions acquired from mutually different sites of the body of the user at the same time.

12. The method according to claim 11, wherein the sensor is configured to detect the pressure distribution for each of a plurality of regions along a first direction, while supporting the body weight of the user lying along the first direction.

13. The method according to claim 12, wherein the plurality of regions include at least one of the group consisting of a head region, an upper body region, a buttock region, and a foot region.

14. The method according to claim 13, wherein in a case where the pressure distribution of a region which is positioned closer to the buttock region than a central portion of the foot region in the first direction is defined as a first foot pressure distribution, and further in a case where the pressure distribution of a region which is positioned closer to a side opposite to the buttock region than the central portion of the foot region is defined as a second foot pressure distribution, when the sensor detects that the first foot pressure distribution is greater than 0 Pa at any position and that the second foot pressure distribution is equal to 0 Pa at any position, the controller is configured to determine that the state of the body of the user shows the lower limb contracture.

15. The method according to claim 13, wherein in a case where the pressure distribution of a region that is positioned closer to the head region than a central portion of the upper body region in the first direction is defined as a first upper body pressure distribution, and further in a case where the pressure distribution of a region that is positioned closer to the buttock region than the central portion of the upper body region is defined as a second upper body pressure distribution, when the sensor detects that a total load generated by the second upper body pressure distribution is higher than a total load generated by the first upper body pressure distribution, the controller is configured to determine that the state of the body of the user shows the kyphosis.

16. The method according to claim 13, wherein in a case where a direction extending along the sensor and perpendicular to the first direction is defined as a second direction, and further in a case where the pressure distributions on respective sides in the second direction with respect to a pressure center position in the region are defined as a first pressure distribution and a second pressure distribution, the controller is configured to determine an orientation of the user in the region, according to a total load generated by the first pressure distribution and a total load generated by the second pressure distribution.

17. The method according to claim 10, wherein the plurality of pressure distributions are pressure distributions acquired from a same site of the body of the user at mutually different times.

18. The method according to claim 17, wherein the controller is configured to determine the state of the body of the user, according to a change rate obtained in such a way that a change amount of the plurality of pressure distributions is divided by a time difference.

* * * * *